(12) United States Patent
VanBuskirk et al.

(10) Patent No.: US 7,257,641 B1
(45) Date of Patent: Aug. 14, 2007

(54) MULTIPOINT PROCESSING UNIT

(75) Inventors: Michael R. VanBuskirk, Redmond, WA (US); Philippe Ferriere, Redmond, WA (US); Mu Han, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/539,026

(22) Filed: Mar. 30, 2000

(51) Int. Cl.
*G06F 15/173* (2006.01)
*G06F 15/16* (2006.01)

(52) U.S. Cl. ............... 709/238; 709/223; 709/231; 709/247

(58) Field of Classification Search ........ 709/203–205, 709/209, 217, 238–239, 242, 246, 247, 223, 709/231
See application file for complete search history.

(56) References Cited

U.S. PATENT DOCUMENTS

| | | | | |
|---|---|---|---|---|
| 5,760,767 A * | 6/1998 | Shore et al. | ............... | 715/723 |
| 5,781,188 A * | 7/1998 | Amiot et al. | ............... | 715/723 |
| 5,867,653 A | 2/1999 | Aras et al. | | |
| 5,930,446 A * | 7/1999 | Kanda | ............... | 386/52 |
| 5,930,797 A * | 7/1999 | Hill | ............... | 707/101 |
| 5,999,173 A * | 12/1999 | Ubillos | ............... | 715/724 |
| 5,999,966 A * | 12/1999 | McDougall et al. | ............... | 709/204 |
| 6,038,425 A * | 3/2000 | Jeffrey | ............... | 725/80 |
| 6,237,025 B1 * | 5/2001 | Ludwig et al. | ............... | 709/204 |
| 6,281,900 B1 * | 8/2001 | Ishikawa | ............... | 715/853 |
| 6,343,313 B1 * | 1/2002 | Salesky et al. | ............... | 709/204 |
| 6,400,378 B1 * | 6/2002 | Snook | ............... | 715/716 |
| 6,519,540 B1 * | 2/2003 | Salandro | ............... | 702/68 |
| 6,571,255 B1 * | 5/2003 | Gonsalves et al. | ............... | 707/104.1 |
| 6,594,773 B1 | 7/2003 | Lisitsa et al. | | |
| 6,600,725 B1 * | 7/2003 | Roy | ............... | 370/261 |
| 6,606,112 B1 * | 8/2003 | Falco | ............... | 348/14.12 |
| 6,650,745 B1 * | 11/2003 | Bauer et al. | ............... | 379/202.01 |
| 6,657,975 B1 * | 12/2003 | Baxley et al. | ............... | 370/260 |
| 6,675,386 B1 * | 1/2004 | Hendricks et al. | ............... | 725/105 |
| 6,714,216 B2 * | 3/2004 | Abe | ............... | 715/723 |
| 6,847,618 B2 * | 1/2005 | Laursen et al. | ............... | 370/261 |
| 6,879,565 B2 * | 4/2005 | Baxley et al. | ............... | 370/261 |

OTHER PUBLICATIONS

Asim Karim, H.323 and Associated Protocols at http://www.cis.ohio-state.edu/jain/cis788-99/h323/index.html (last visited Mar. 11, 2000) 21 pages.

(Continued)

*Primary Examiner*—Ario Etienne
*Assistant Examiner*—Hussein El-chanti
(74) *Attorney, Agent, or Firm*—Perkins Coie LLP

(57) ABSTRACT

A system to provide a multipoint processing terminal and a multicast bridging terminal to provide mixing, switching, and other processing of media streams under the control of H.323 components. Application Programming Interfaces defined for the multipoint processing terminal provide a multipoint control unit with the capability to change the default behavior of the multipoint processing terminal by allowing the multipoint control unit to control the routing audio and video streams in the multipoint processing terminal and control the media formats in a multipoint conference. Multipoint processing acceleration functionality is provided by providing interfaces to allow hardware accelerated implementations of multipoint processing terminals. The multicast bridging terminals enables clients using one type of control signaling and media streaming to join other conferences using different types of control signaling and media streaming by receiving audio or video data from an incoming media stream and performing any processing necessary to transform the media stream from the incoming stream data format to the outgoing stream data format.

26 Claims, 13 Drawing Sheets

OTHER PUBLICATIONS

IP Telephony With TAPI 3.0 White Paper, copyright 1999 Microsoft Corporation, 34 pages.

TAPI 3.0 Connection and Media Services White Paper, copyright 1999, Microsoft Corporation, 23 pages.

A Sample TAPI 3.0 Application White Paper, copyright 1999, Microsoft Corporation, 27 pages.

Talk Through 1/Talk ThroughHost1 Developer's Manual and Function Refernce Manual, copyright 1997, MiBridge, Inc., Eatontown, NJ, 49 pages.

*H.231 Standard,* Telecommunication Standardization Sector of ITU (Mar. 1996).

*H.243 Standard,* Telecommunication Standardization Sector of ITU (Mar. 1996).

U.S. Appl. No. 10/856,262, filed May 27, 2004, Huai.

* cited by examiner

MULTIPOINT PROCESSING UNIT

TECHNICAL FIELD

This invention relates generally to computer telephony systems and, more particularly, relates to systems and methods for providing audio and video conferencing and telephony.

BACKGROUND OF THE INVENTION

Frequently, situations arise where a meeting between geographically separated parties would be appropriate, but the expenses associated with physical travel are prohibitive to that meeting taking place. The meeting size may exceed available space and gathering all meeting participants in one place is often inefficient. In these situations, industry developed teleconferencing, which provides a convenient, low-cost solution by allowing individuals from various geographic locations to have a meeting over the telephone on the Public Switched Telephone Network (PSTN). While teleconferencing solved some problems, it soon became apparent that teleconferencing is limited to situations where only voice communication is necessary.

In response, industry developed video conferencing systems and data transfer systems on separate networks. These conferencing systems required new and significant hardware, software and programming, and significant communications network connections. For example, stand-alone, "room" systems for audio and video conferencing typically require dedicated hardware at significant expense, in the tens of thousands of dollars, utilizing dedicated video cameras, television or video displays, microphone systems, and the additional video conferencing equipment. These systems also require as many as six (or more) contiguous communication channels. Such communication network capability is also expensive and potentially unnecessary, particularly when the additional channels are not in continuous use. These separate networks have different transport requirements and are expensive to install, maintain, and reconfigure.

As computer technologies advanced, the concept of using voice, data and video over existing IP-based LANs, WANs, intranets, and the Internet emerged. Industry leaders developed IP telephony that enabled multimedia (voice, data, and video) collaboration over a network and it has revolutionized the way society works, entertains, and stays informed. As IP telephony matures and organizations continue to shift from the expensive and inflexible PSTNs to IP-based networks, industry leaders have developed and are developing standards for multimedia communications. The International Telecommunications Union (ITU) is one organization that is developing these standards. One set of ITU standards for multimedia is called H.323.

The H.323 set of standards include standards for data channels, monitoring channels, and control channels. According to the H.323 group of standards, audio and video data streams to be transmitted are encoded (compressed) and packetized in conformance with a real-time transport protocol (RTP) standard. The packets thus generated include both data and header information. The header information includes information whereby synchronization, loss detection, and status detection are facilitated. In order to allow for the exchange of status information between a sender and a receiver, a real-time transport control protocol (RTCP) channel is opened. An H.245 control channel is established to provide control functions. This channel supports the exchange of capability information, the opening and closing of data channels, and other control and indication functions. Within the H.323 standard, video applications may use the H.261, H.262, or H.263 protocols for data transmissions, while audio applications may use the G.711, G.722, G.723.1, G.728, or G.729 protocols. Any class of network which utilizes TCP/IP will generally support H.323 compliant teleconferencing. Examples of such networks include the Internet and many LANs. FIG. 13 illustrates an H.323 inter-network 800.

Four logical entities or components are essential in an H.323 enabled network. These are terminals 802, gateways 806, gatekeepers 808, and multipoint control units (MCU) 810. Terminals, gateways, and MCUs are collectively known as endpoints. An H.323-enabled network can be established with only terminals, but the other components are essential to provide greater practical usefulness of the services. A terminal, or a client, is an endpoint where H.323 data streams and signaling originate and terminate. It may be a multimedia PC with a H.323 compliant stack or a standalone device such as a USB (universal serial bus) IP telephone 818. A terminal must support audio communication 812, 814. Video communication 816 and data 820 communication support is optional.

A gatekeeper 808 ensures reliable, commercially feasible communications. A gatekeeper provides central management and control services. When a gatekeeper exists, all endpoints (terminals, gateways, and MCUs) must be registered with it. Control messages are routed through the gatekeeper. The gatekeeper provides several services to all endpoints in its zone. These services include address translation, admission and access control of endpoints, and may provide bandwidth management, call routing capability, and control of media routing. A gatekeeper can route all calls originating or terminating in its zone, and may control media routing of those calls. A gatekeeper that controls media routing also acts as a multipoint controller (MC). This capability provides numerous advantages. Gatekeepers map LAN aliases to IP addresses and provide address lookups when needed. Gatekeepers also exercise call-control functions to limit the number of H.323 connections and the total bandwidth used by these connections, in an H.323 zone. A gatekeeper can re-route a call to an appropriate gateway based on bandwidth availability.

A gateway 806 is an optional component in a H.323-enabled network. Gateways bridge H.323 conferences to other networks, communications protocols, and multimedia formats and provides data format translation, control signaling translation, audio and video codec translation, and call setup and termination functionality on both networks. Gateways are not required if connections to other networks, such as a PSTN 420, or non-H.323-compliant terminals are not needed.

A multipoint control unit (MCU) 810 enables conferencing between three or more endpoints. It consists of a mandatory multipoint controller (MC) and zero or more multipoint processors (MP). The MCU may be combined into a terminal, gateway, or gatekeeper. In cases where the gatekeeper contains a MC, the MC component of the MCU may act as a slave MC under control of the gatekeeper's MC. The multipoint controller provides a centralized location for media control channels of a multipoint conference setup. Media control signaling is routed through the MC so that endpoints capabilities can be determined and communication parameters negotiated. The MC may be used in a point-to-point call which can later be extended into a multipoint conference. When there is a change in the number of participants in the conference, the MC can determine the distribution topology to use for the audio and video streams depending on the multicast capability of the underlying network, the capabilities of MPs in the network, the capabilities of the terminal endpoints, and the physical topology of the network with respect to the terminal endpoints and MP endpoints of the multipoint conference. The multipoint processor handles the mixing, switching, and processing of the audio, video, and data streams among the conference endpoints. The MCU is necessary in a centralized multipoint conference where each terminal establishes a point-to-point connection with the MCU. The MC component of the MCU determines the capabilities of each terminal and MP component of the MCU sends each terminal a processed media stream. In the decentralized model of multipoint conferencing, a MC ensures communication compatibility, but the media streams are multicast and mixing is performed at each terminal. It should be noted that media distribution in a multipoint conference may be a hybrid of centralized and decentralized distribution modes, media may be distributed through multiple MPs, and distribution may be via multicast network capabilities in some, all, or none of the branches of the conference.

In either type of multipoint conferencing, there are multiple audio and video streams and these streams could be coming from various sources and processing requirements for the streams may be different. For these streams to be seen by all participants, the streams may need to be transcoded to formats that participants are capable of seeing. If this could not be done for a particular participant, that participant could not participate in the conference. In order to allow all potential participants to participate in a conference, the MCU and the gateway has to have the capability to perform the transcoding that may be required. One shortcoming of this is that the MCU or gateway has to be a mammoth service provider to perform the transcoding that may be required. A further drawback is that the MCU or gateway would have to be in complete control of the media for the entire multipoint conference and know exactly what has to be done with the media.

A method is needed whereby the computational resources of specialized terminals are used to transcode data from one format to another or apply signal processing operations to the data in its native format, thereby freeing up resources for the MCUs and gateways.

SUMMARY OF THE INVENTION

In order to provide efficient multipoint processing services, the invention allows for transcoding data between formats and applying signal processing operations to the data in its native format without restraining the resources of the host. Specialized terminals provide the multipoint processing services.

The invention provides for multipoint processing terminals (MPT's) to provide mixing, switching, and other processing of media streams and multicast bridging terminals (BT's) to bridge a client using one type of control signaling and media streaming to a conference using different types of control signaling and media streaming.

Application Programming Interfaces (API's) defined for the MPT provide the application using the MPT the capability to change the default behavior of the MPT by allowing the application to control the routing audio and video streams in the MPT and control the media formats in a multipoint conference. Multipoint processing acceleration functionality is provided by providing interfaces to allow hardware accelerated implementations of MPTs. The multicast bridging terminals enable clients using one type of control signaling and media streaming to join other conferences using different types of control signaling and media streaming by receiving audio or video data from an incoming media stream from either the client or a participant in the conference and performing any processing necessary to transform the media stream from the incoming stream data format to the outgoing stream data format, and sending the outgoing stream to either a participant in the conference or the client.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
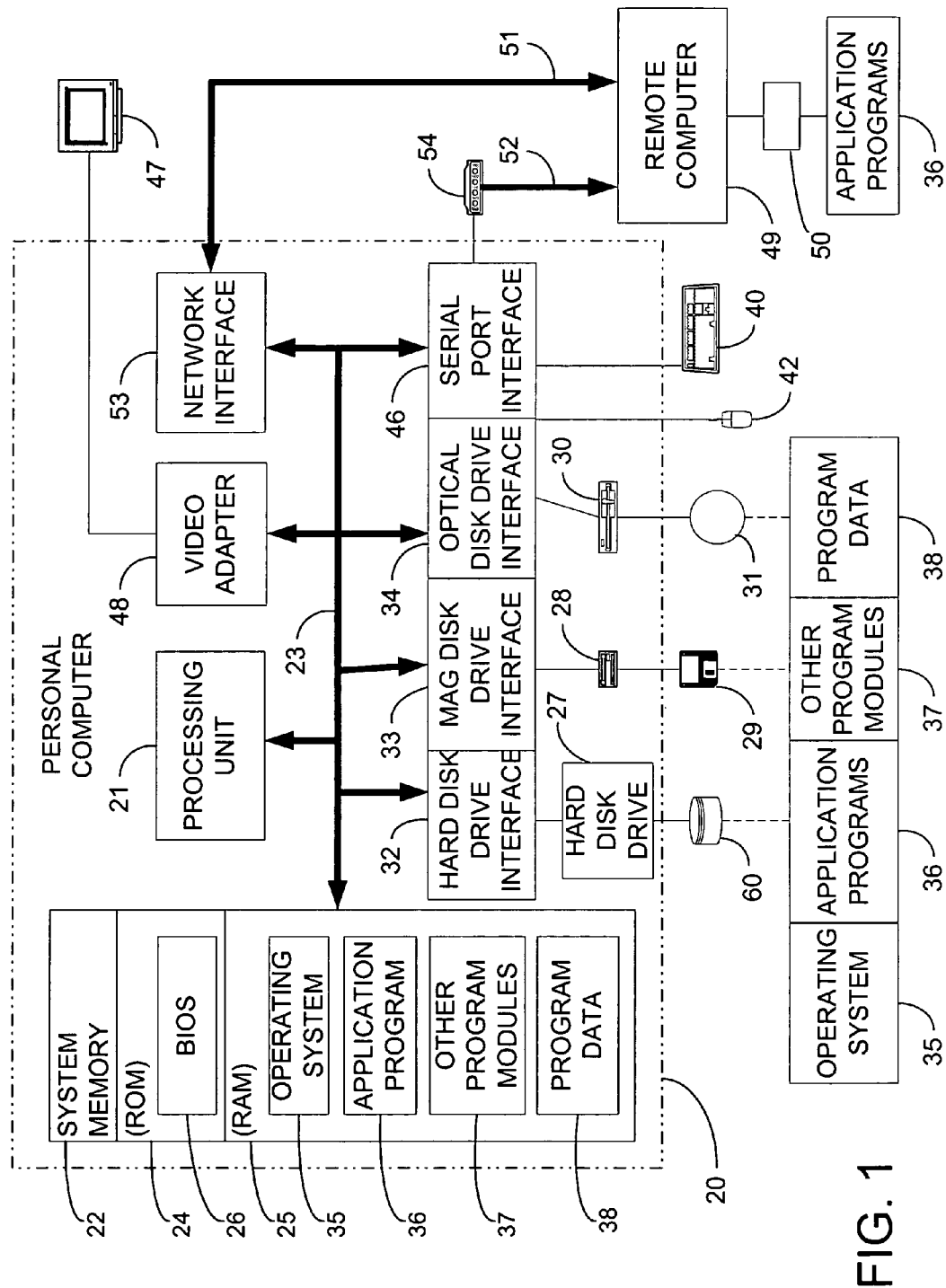
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware. The invention will be described in the context of the Microsoft Windows operating system. Although the invention will be described in the context of the Windows operating system, one of skill in the art will appreciate that the invention is not limited to this implementation. To provide a better understanding of the invention, an overview of the relevant portions of the Microsoft Windows operating system will be described.

The Windows Driver Model (WDM) is a common set of services which allow the creation of drivers having compatibility between the Microsoft brand Windows 98 operating system and the Microsoft brand Windows 2000 operating system. Each WDM class abstracts many of the common details involved in controlling a class of similar devices. WDM utilizes a layered approach, implementing these common tasks within a WDM "class driver." Driver vendors may then supply smaller "minidriver" code entities to interface the hardware of interest to the WDM class driver.

WDM provides, among other functions, a stream class driver to support kernel-mode streaming, allowing greater efficiency and reduced latency over user mode streaming. The stream architecture utilizes an interconnected filter organization, and employs the mechanism of "pins" to communicate to and from the filters, and to pass data. Both filters and pins are Component Object Model (COM) objects. The filter is a COM object that performs a specific task, such as transforming data, while a pin is a COM object created by the filter to represent a point of connection for a unidirectional data stream on the filter. Input pins accept data into the filter while output pins provide data to other filters. Filters and pins preferably expose control interfaces that other pins, filters, or applications can use to configure the behavior of those filters and pins. An embodiment of the invention will be described by reference to the filters and pins of the WDM model hereinafter.

Figure 12:
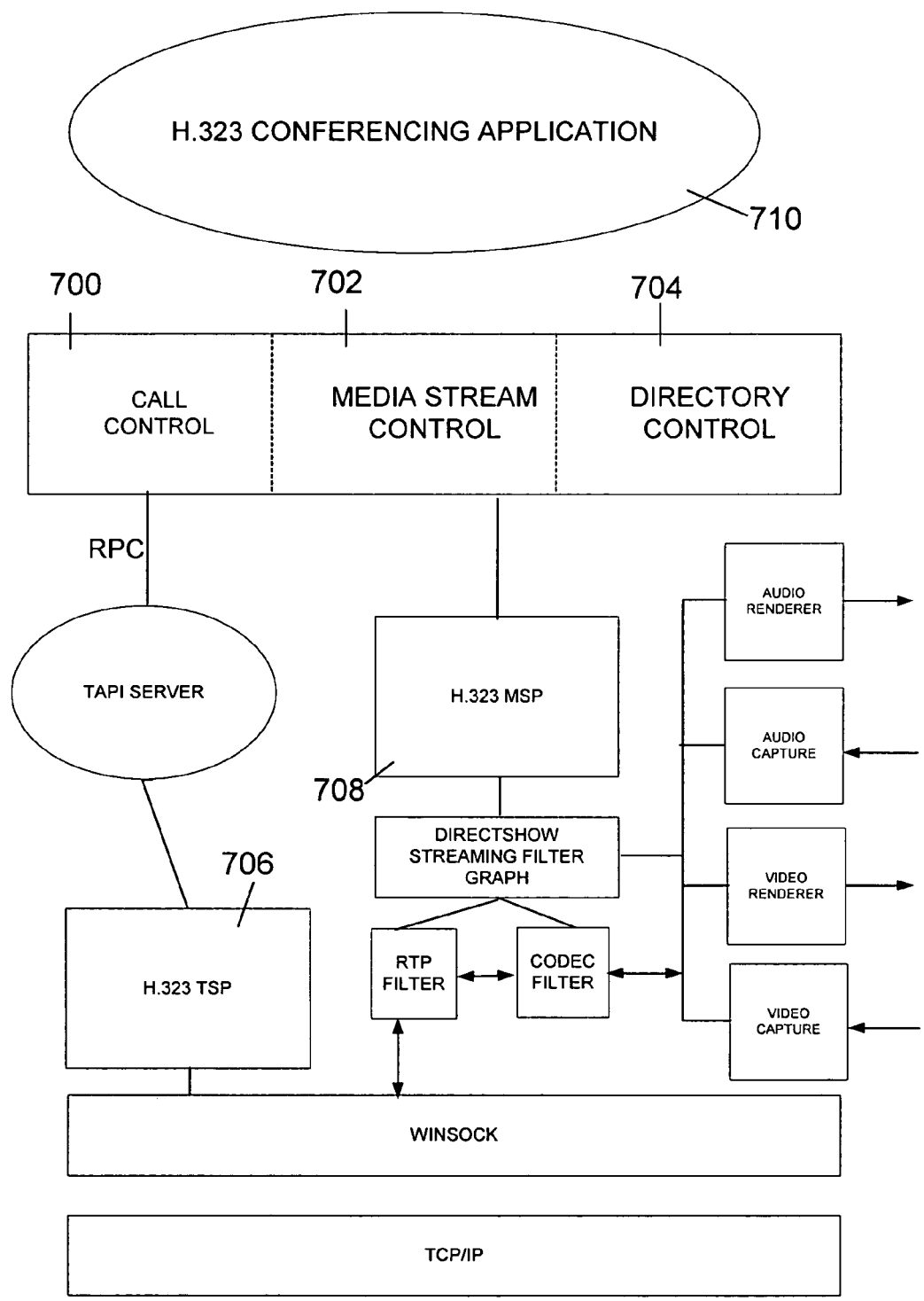
FIG. 12 is a diagram schematically illustrating the components of the TAPI 3.0 architecture usable to implement an embodiment of the invention.
Figure 13:
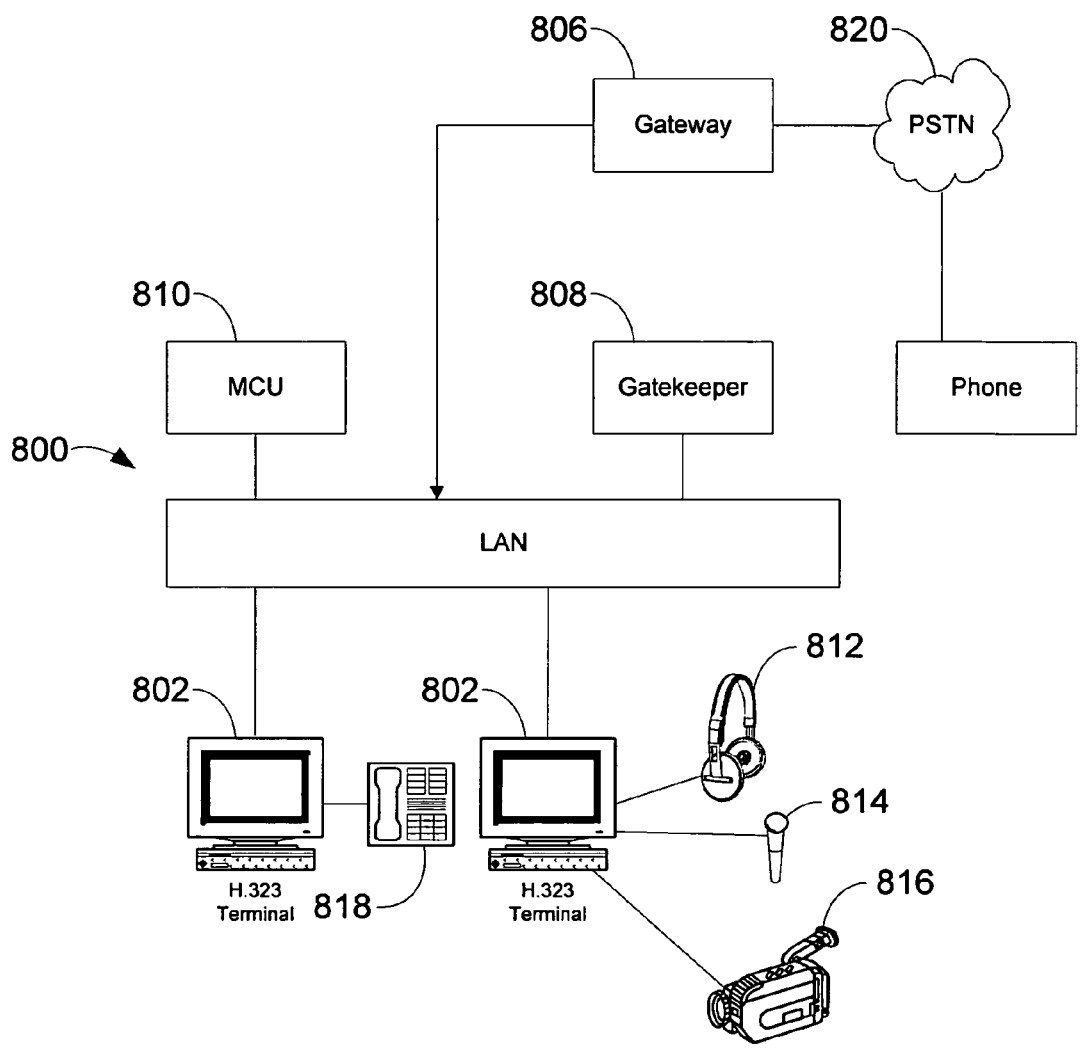
FIG. 13 is an illustration of an H.323 inter-network.

As illustrated in FIG. 12, to control and access the kernel mode streaming data of the WDM architecture, a module such as Microsoft brand Telephony Application Programming Interface 3.0 (TAPI 3.0) running in user mode may be utilized by an application 710. The TAPI 3.0 COM API is implemented as a suite of COM objects, chiefly Call Control 700, Media Stream Control 702, and Directory Control 704. A Telephony Service Provider (TSP) 706 is responsible for resolving the protocol-independent call model of TAPI into protocol-specific call-control mechanisms. A Media Stream Provider (MSP) 708 implements Microsoft brand DirectShow filters and interfaces for a particular TSP and is responsible for resolving the protocol-independent media control model of TAPI into protocol-specific media control mechanisms. Microsoft brand DirectShow, part of the WDM, is an architecture which facilitates the control of multimedia data streams via modular components. TAPI 3.0 employs a kernel streaming proxy module such as KSProxy, a Microsoft DirectShow filter, to control and communicate with kernel mode filters. KSProxy provides a generic method of representing kernel mode streaming filters as DirectShow filters. Running in user mode, KSProxy accepts existing control interfaces and translates them into input/output control calls to the WDM streaming drivers. TAPI 3.0 may automatically create the WDM filter graph by invoking the appropriate filters and connecting the appropriate pins.

Figure 2:
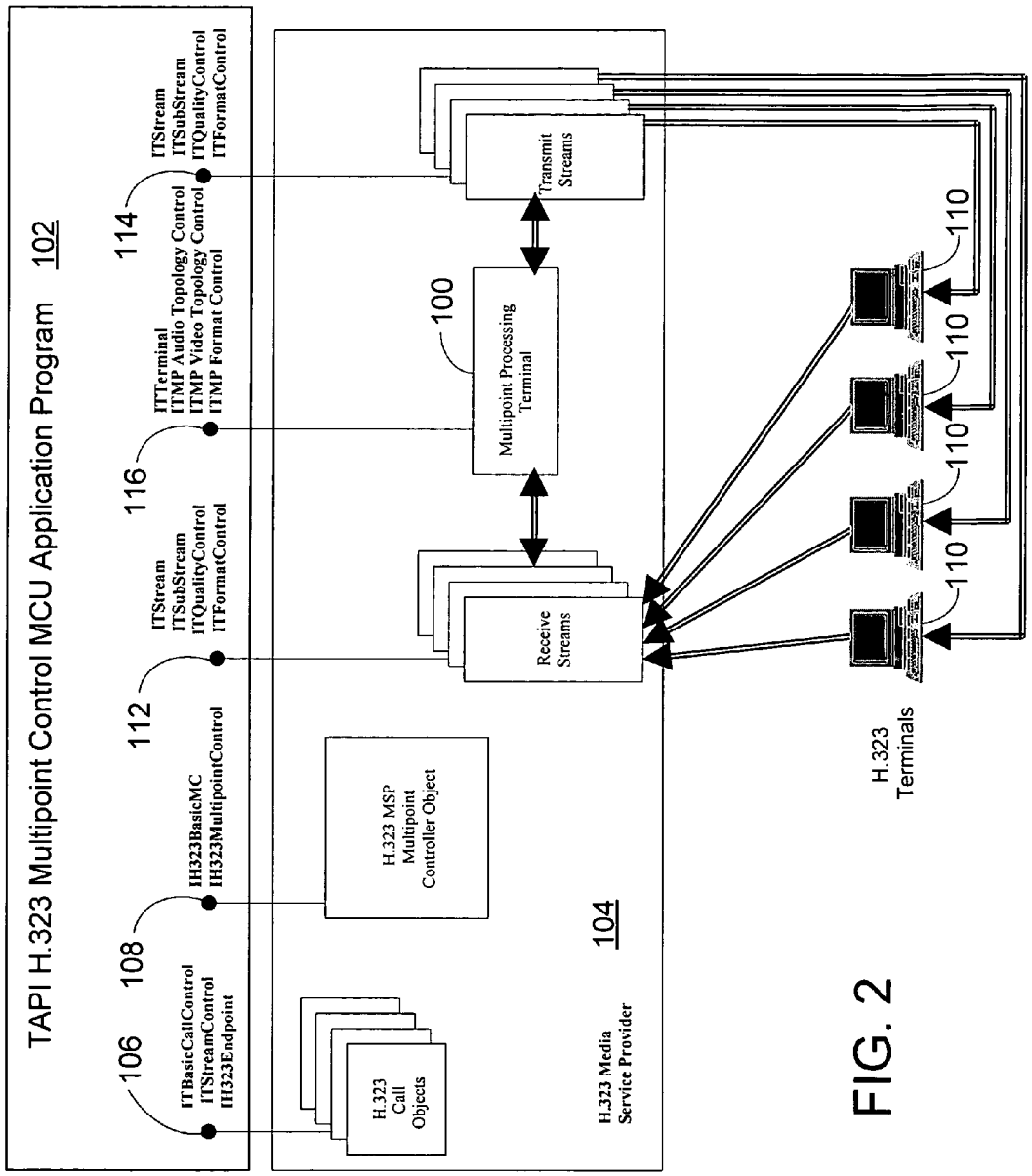
FIG. 2 is a block diagram illustrating a centralized multipoint conference employing a multipoint processing terminal of the instant invention.
Figure 3:
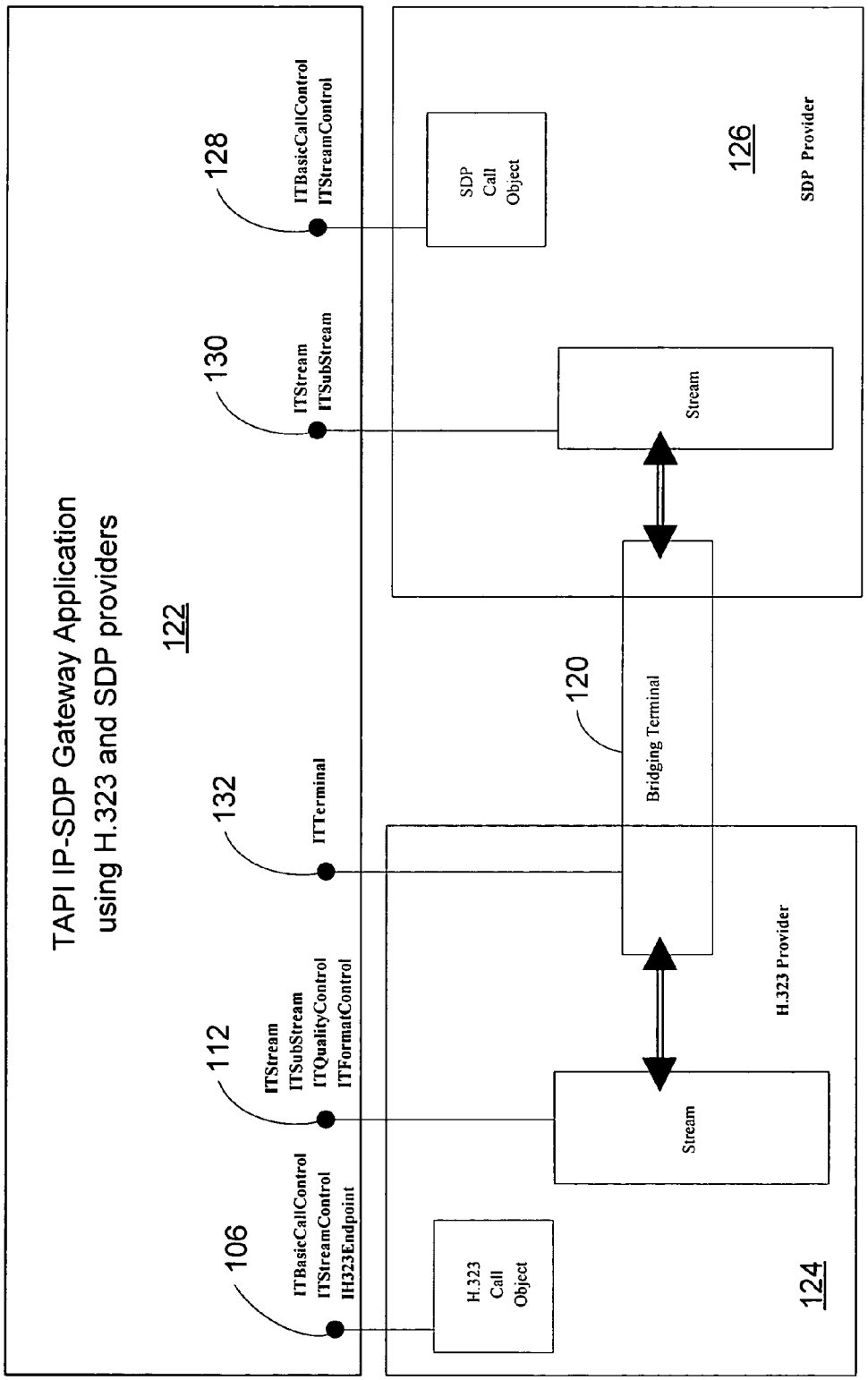
FIG. 3 is a block diagram illustrating a bridging terminal of the instant invention to map call instances from one provider to another provider.

FIGS. 2-3 illustrate a subset of MSP components with the multipoint processing terminal (MPT) and bridging terminal of the instant invention. FIG. 2 illustrates a MPT 100 being controlled by a multipoint control application program 102 in a centralized conference. The application 102 uses the MSP 104 for call control using call interfaces and notifications for call signaling on pin 106 and for conference control using conference interfaces provided on pin 108. Audio, video, and data streams (media streams) being transmitted to and received by H.323 terminals 110 participating in the conference are controlled by the application 102 via stream interfaces on pins 112 and 114. It should be noted that multicast may be used to distribute the media streams. The MPT 100 provides central media processing capability for the media streams and the application 102 uses the interfaces on pin 116 to control the MPT 100.

FIG. 3 illustrates a gateway between two service providers. A gateway application 122 controls a bridging terminal 120 to stream media between a provider 124 and a provider 126. Each provider uses call control using call interfaces and notifications for call signaling on pin 106 and pin 128, respectively. The gateway application 122 controls the media streams via stream interfaces on pins 112 and 130 and the gateway application 122 controls the bridging terminal 120 via interfaces on pin 132.

Figure 4:
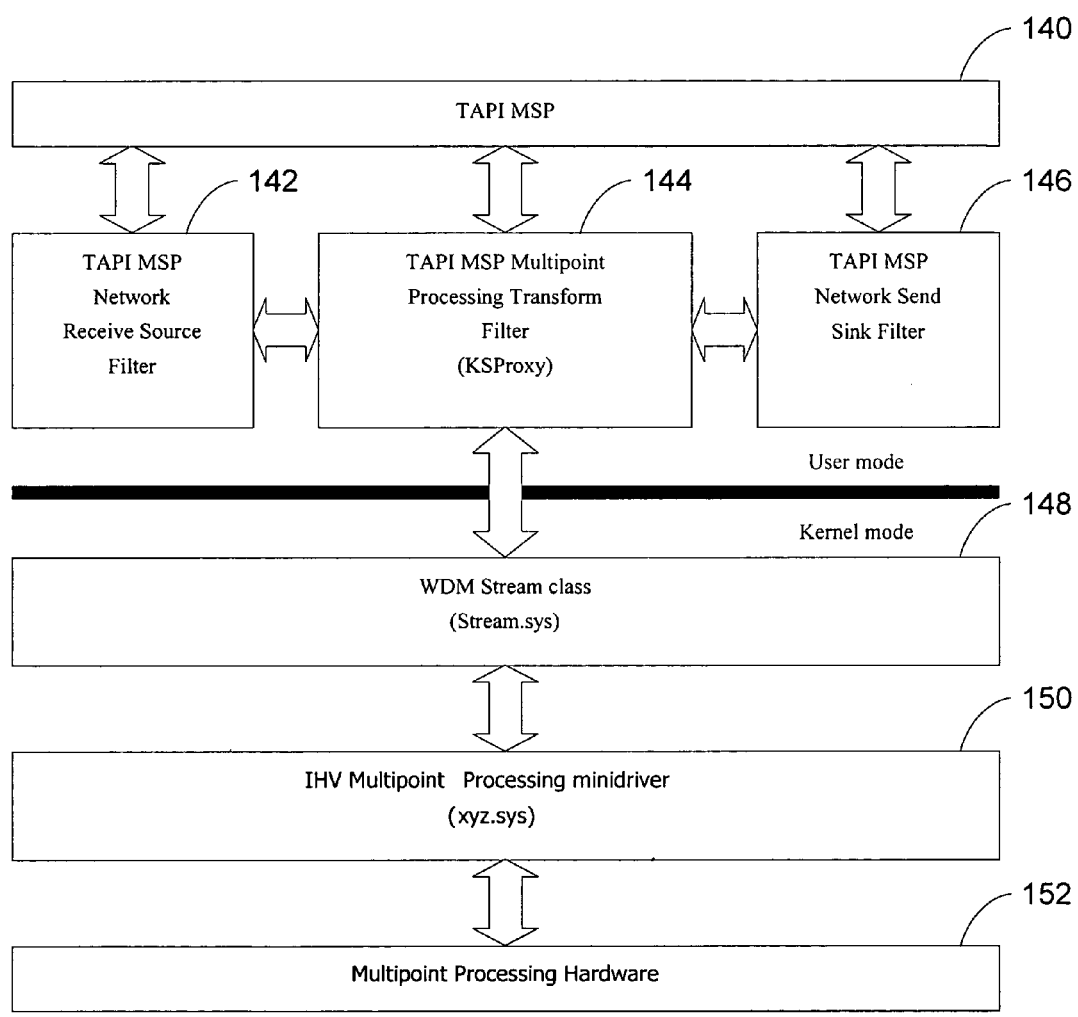
FIG. 4 is a block diagram of an embodiment of the invention illustrating the connections between components in an operating system employing a multipoint processing filter to provide mixing, switching, and other processing of media streams.

FIG. 4 is an architectural overview of a MPT incorporated in the Windows operating system and shows how the MPT interfaces with the MSP and the WDM components. The MSP 140 is located in user mode and media streams flow between the MSP 140 and DirectShow filters. The filters the MSP 140 typically connects to provide multipoint processing capability comprise a source filter 142, a multipoint processing filter 144, and a sink filter 146. The multipoint processing filter 144 represents an instance of KSProxy and accepts commands from the interfaces to MSP applications and translates them into input/output control calls to the WDM class driver 148. A multipoint processing minidriver 150 supplied by a driver vendor interfaces the multipoint processing accelerating hardware 152 to the WDM class driver 148.

The multipoint processing minidriver 150 preferably supports multiple, simultaneous streams of audio and video data. The minidriver 150 preferably creates a new stream for each data type that can be produced simultaneously with other data types. The WDM class driver 148 exposes a separate pin for each stream. Each pin (or stream) can support a variety of different formats. A single video input pin can handle RTP-packetized H.261 and H.263 compressed digital video. A single audio output pin can generate RTP-packetized G.711, G.723 and G.729 compressed audio data.

Figure 5:
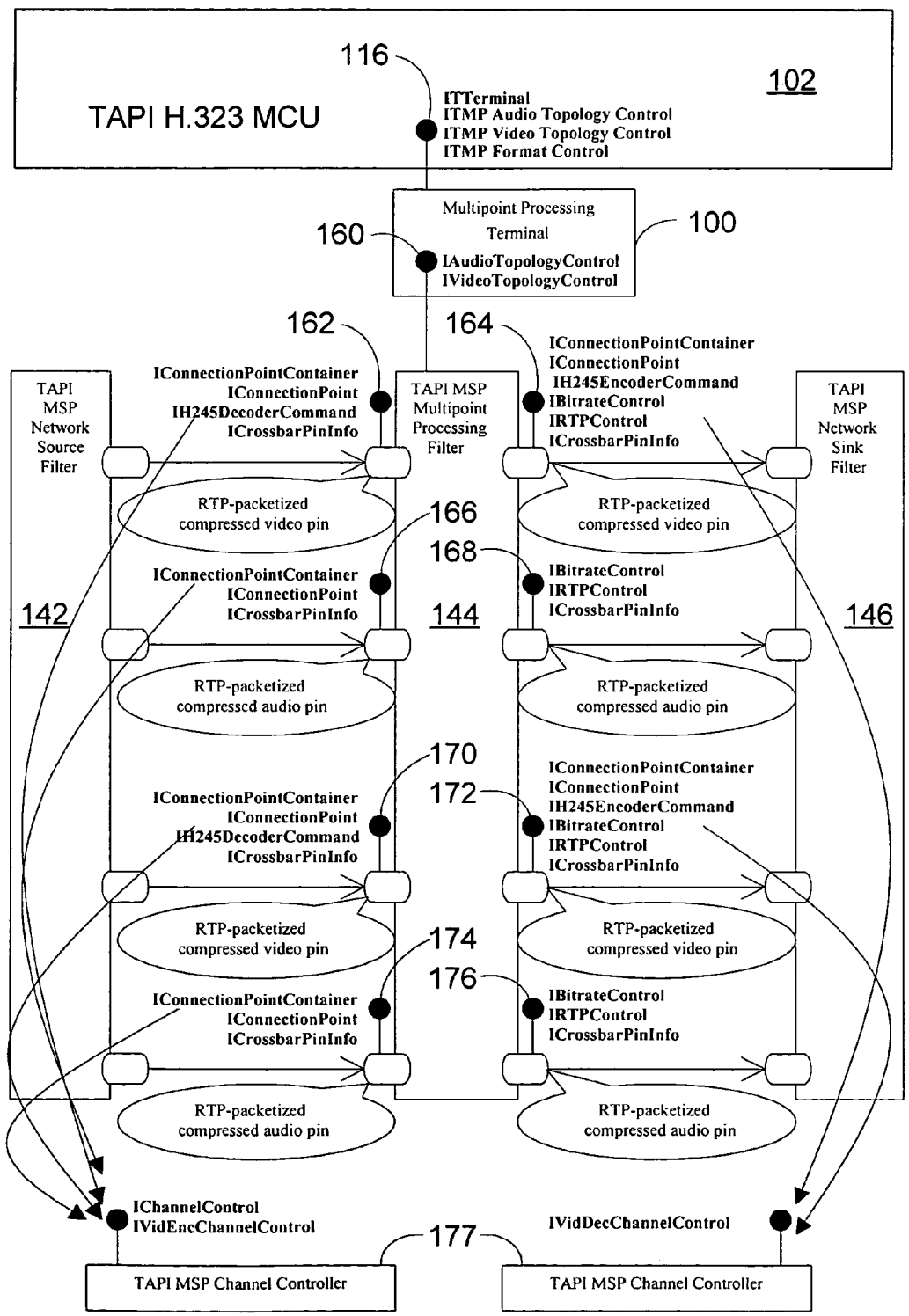
FIG. 5 is an illustration showing the interfaces a multipoint processing terminal and a multipoint processing filter expose to provide multipoint processing functionality.

The interfaces and properties used to implement the architecture of a MPT 100 and multipoint processing filter 144 will now be discussed in greater detail. The multipoint processing filter 144 and multipoint processing hardware accelerator 152 preferably are able to handle a large number of simultaneous conferences. FIG. 5 shows the interfaces that an MPT 100 exposes to an application 102 on pin 116 to provide the application 102 the capability to control certain features of the MPT 100, the interfaces on pin 160 to provide the MPT 100 with control over the multipoint processing filter 144, and the connections and interfaces between the multipoint processing filter 144 and source filter 142 and between the multipoint processing filter 144 and the sink filter 146. The multipoint processing filter 144 receives a RTP-packetized compressed video input stream at pin 162 and at pin 170 and a RTP-packetized compressed audio input stream at pin 166 and at pin 174. The multipoint processing filter 144 outputs a RTP-packetized compressed video output stream at pin 164 and at pin 168 and a RTP-packetized compressed audio output stream at pin 172 and at pin 176.

The interfaces preferably exposed on pin 116 are the ITTerminal base interface, the ITMPAudioTopologyControl interface, the ITMPVideoTopologyControl interface, and the ITMPFormatControl interface. The ITTerminal interface, part of the existing TAPI interface, allows an application 102 to learn about the basic properties of a MPT 100. These basic properties are the descriptive name for a terminal, the current state of a terminal, the type of a terminal, the class of a terminal, the type of media supported by the terminal, and the media stream direction for a terminal. A MPT 100 may receive and generate media streams and provides support for audio and video types of media.

An application 102 uses the ITMPAudioTopologyControl interface exposed by the MPT 100 to change default configurations of the MPT 100. The interface allows the application 102 to control the routing of audio input streams towards the audio output streams, to query the MPT 100 for the current audio energy levels on the audio input streams, to retrieve the capabilities of an audio crossbar regarding audio mixing and transcoding, and to configure some control properties. The details of the control mechanisms and crossbars will be discussed in more detail hereinafter. Applications 102 should only use this interface to modify the default behavior of the MPT 100. The ITMPAudioTopologyControl interface contains a set of methods preferably including GetCrossbar, SetCrossbar, GetProperty, GetPropertyRange, SetProperty, GetCapabilities, and GetInputSignaLevel. GetCrossbar is used to retrieve the current audio crossbar topology that indicates how a set of audio input streams are being be routed to another set of audio output streams. SetCrossbar is used to apply a new audio crossbar topology that indicates to the MPT how a set of audio input streams should be routed to another set of audio output streams. GetProperty is used to get the current value of a specific audio crossbar control setting. GetPropertyRange is used to retrieve the minimum, maximum, and default values for a specific audio crossbar control setting. SetProperty is used to set the current value of a specific audio crossbar control setting. GetCapabilities is used to retrieve audio crossbar capabilities regarding mixing and transcoding. GetInputSignalLevel is used to retrieve the current value of the audio level of a list of audio input streams.

An application 102 uses the ITMPVideoTopologyControl interface to control the routing of the video input streams towards the video output streams. MCUs should only use this interface to modify the default behavior of a MPT 100. The ITMPVideoTopologyControl interface contains a set of methods preferably including GetCrossbar, SetCrossbar, GetProperty, GetPropertyRange, SetProperty, and GetCapabilities. GetCrossbar is used to retrieve the current video crossbar topology that indicates how a set of video input streams are being be routed to another set of video output streams, based on the content of the associated audio input streams if requested. SetCrossbar is used to apply a new video crossbar topology that indicates to the MPT 100 how a set of video input streams should be routed to another set of video output streams, based on the content of the associated audio input streams. GetProperty is used to get the current value of a specific video crossbar control setting. GetPropertyRange is used to retrieve the minimum, maximum, and default values for a specific video crossbar control setting. SetProperty is used to set the current value of a specific video crossbar control setting. GetCapabilities is used to retrieve video crossbar mixing capabilities regarding picture composition.

Audio and video MPTs expose an ITFormatControl interface. Applications use this interface to query the MPT 100 for an ordered list of supported conference formats and configuration capabilities, the preferred conference format, and set a new preferred conference format or ordered set of formats on the MPT 100. This interface contains a set of methods preferably including GetFormats, SetFormats, GetNumberOfCapabilities, GetAudioConfigCaps, GetVideoConfigCaps, ReOrderAudioCapabilites and ReOrderVideoCapabilites. GetFormats is used to retrieve the preferred audio and video formats for a conference. SetFormats is used to set the preferred audio and video formats for a conference. GetNumberOfCapabilities is used to retrieve the number of audio and video format structure and configuration capability structure pairs that are available in the context of a conference. Configuration capability structures are used to express the kinds of audio and video formats supported by a conference. GetAudioConfigCaps is used to retrieve a format structure and configuration capability structure pair that completely describes an audio format supported by the conference. GetVideoConfigCaps is used to retrieve a format structure and configuration capability structure pair that completely describes a video format supported by the conference. ReOrderAudioCapabilities is used to reorder the list of preferred audio formats for the conference. ReOrderVideoCapabilities is used to reorder the list of preferred video formats for the conference.

The MPT 100 uses interfaces exposed by the multipoint processing filter 144 on pin 160 to control the routing of the audio and video input streams towards the output streams. These interfaces are the IAudioTopologyControl interface and the IVideoTopologyControl interface.

The IAudioTopologyControl interface contains a set of methods preferably including GetCrossbar, SetCrossbar, GetProperty, GetPropertyRange, SetProperty, GetCapabilities, and GetInputSignalLevel. These methods are similar to the ITMPAudioTopologyControl interface. GetCrossbar is used to retrieve the current audio crossbar topology that indicates how a set of audio input streams are being be routed to another set of audio output streams. SetCrossbar is used to apply a new audio crossbar topology that indicates to the multipoint processing filter 144 how a set of audio input streams should be routed to another set of audio output streams. GetProperty is used to get the current value of a specific audio crossbar control setting. GetPropertyRange is used to retrieve the minimum, maximum, and default values for a specific audio crossbar control setting. SetProperty is used to set the current value of a specific audio crossbar control setting. GetCapabilities is used to retrieve audio crossbar capabilities regarding mixing and transcoding. GetInputSignalLevel is used to retrieve the current value of the audio level of a list of audio input streams.

The IVideoTopologyControl interface contains a set of methods preferably including GetCrossbar, SetCrossbar, GetProperty, GetPropertyRange, SetProperty, and GetCapabilities. The IVideoTopologyControl interface and the ITMPVideoTopologyControl interface are similar. GetCrossbar is used to retrieve the current video crossbar topology that indicates how a set of video input streams are being be routed to another set of video output streams, based on the content of the associated audio input streams if requested. SetCrossbar is used to apply a new video crossbar topology that indicates to the multipoint processing filter 144 how a set of video input streams should be routed to another set of video output streams, based on the content of the associated audio input streams. GetProperty is used to get the current value of a specific video crossbar control setting. GetPropertyRange is used to retrieve the minimum, maximum, and default values for a specific video crossbar control setting. SetProperty is used to set the current value of a specific video crossbar control setting. GetCapabilities is used to retrieve video crossbar mixing capabilities regarding picture composition.

The IAudioTopologyControl interface and the IVideoTopologyControl are not standard DirectShow interfaces and are not implemented natively by KSProxy. The multipoint processing filter 144 uses the generic IKsControl interface exposed by KSProxy and defines property sets called PROPSETID_AUDIOTOPOLOGYCONTROL and PROPSETID_VIDEOTOPOLOGYCONTROL. Multipoint processing minidriver 150 implementations handle the properties defined in these property sets on a stream basis. The PROPSETID_AUDIOTOPOLOGYCONTROL property set contains the properties KSPROPERTY_AUDIOTOPOLOGYCONTROL_CROSSBAR (used to update or retrieve the content of the audio crossbar—The AUDIOTOPOLOGYCONTROL_CROSSBAR_S structure is used to represent the crossbar topology), KSPROPERTY_AUDIOTOPOLOGYCONTROL_CAPABILITIES (used to retrieve the capabilities of the audio crossbar regarding mixing and transcoding), KSPROPERTY_AUDIOTOPOLOGYCONTROL_SCHEDULEISR (used to set or get the periodicity of the Interrupt Service Routine in 100 nanosecond units) KSPROPERTY_AUDIOTOPOLOGYCONTROL_MAXNUMMIXEDSPEAKERS (used to set or get the maximum number of mixed input signals) KSPROPERTY_AUDIOTOPOLOGYCONTROL_SILENCEDETECTION (used to enable/disable silence detection), KSPROPERTY_AUDIOTOPOLOGYCONTROL_SILENCECOMPRESSION (used to enable/disable silence compression), KSPROPERTY_AUDIOTOPOLOGYCONTROL_AGC (used to enable/disable automatic gain control) KSPROPERTY_AUDIOTOPOLOGYCONTROL_ENERGYLEVELS (used to retrieve the current value of the audio level of a list of audio input streams). The PROPSETID_VIDEOTOPOLOGYCONTROL property set contain the properties KSPROPERTY_VIDEOTOPOLOGYCONTROL_CROSSBAR (used to update or retrieve the content of the video crossbar—use the VIDEOTOPOLOGYCONTROL_CROSSBAR_S structure to represent the crossbar topology.), KSPROPERTY_VIDEOTOPOLOGYCONTROL_CAPABILITIES (used to retrieve the capabilities of the video crossbar regarding picture composition), KSPROPERTY_VIDEOTOPOLOGYCONTROL_SCHEDULEISR (used to set or get the periodicity of the Interrupt Service Routine in 100 nanosecond units), KSPROPERTY_VIDEOTOPOLOGYCONTROL_BROADCASTERCANDIDACY (used to set or get the number of ms to evaluate whether a new speaker is continuing to speak), KSPROPERTY_VIDEOTOPOLOGYCONTROL_VIDEOSWITCHINGDWELL (used to set or get the number of ms during which the new speaker and video switching process cannot be taken over by a second speaker), and KSPROPERTY_VIDEOTOPOLOGYCONTROL_FASTUPDATE (used to set or get the number of ms between the time when a switch is made and when the Fast Update Request is sent to the new speaker's H.323 system)

Figure 6:
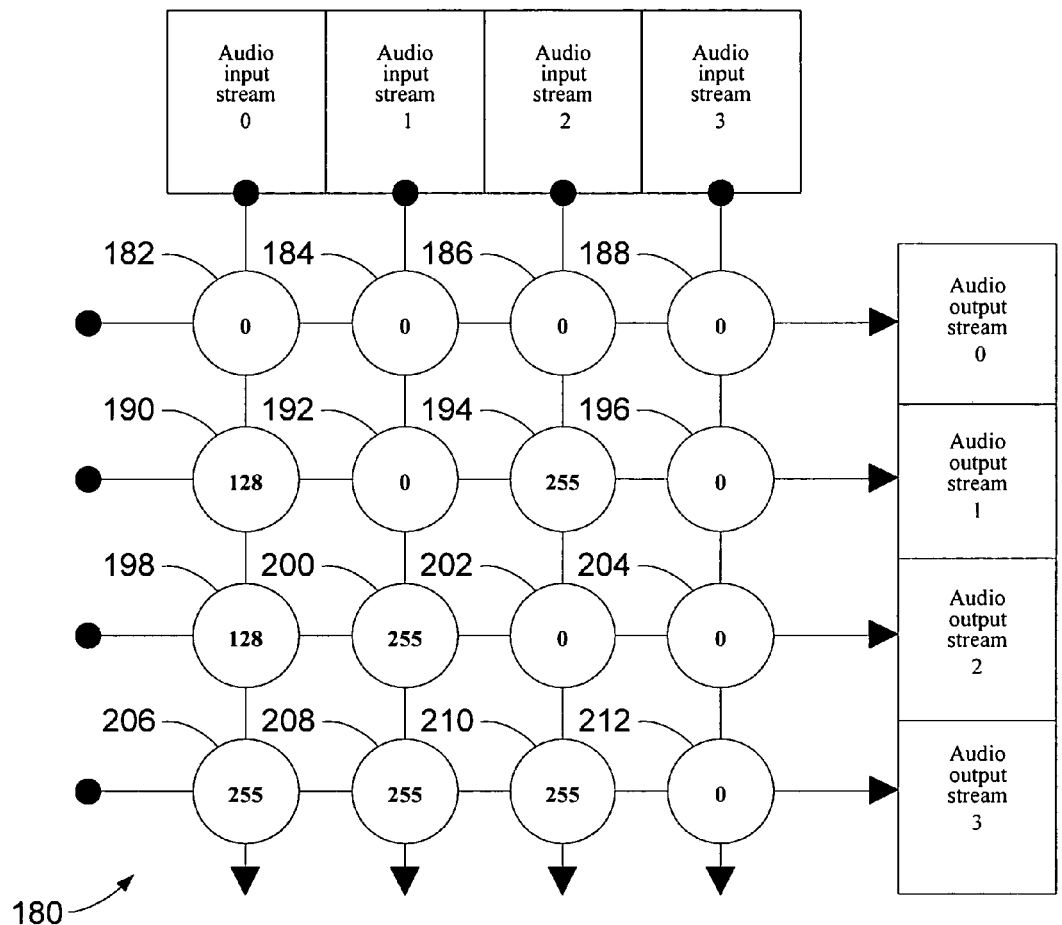
FIG. 6 is an illustration of an audio crossbar illustrating how audio input streams are routed to audio output streams.

Routing of audio input streams towards audio output streams is described using a crossbar. Each stream has a unique stream Id that is used to identify a stream as an input stream or an output stream to a conference. Each stream is identified using its positional index in the crossbar. A crossbar consists of crossbar nodes. Each node is described using an AUDIO_NODE_S bitfield and each crossbar node has a value that the MPT 100 and the multipoint processing filter 144 uses to understand the desired overall topology. FIG. 6 illustrates an audio crossbar 180 in a multipoint conference for four participants in the conference. The crossbar 180 has 16 crossbar nodes. In one embodiment, the node values range from 0 to 255. A value of zero signals an unconnected node. Every other value indicates a connected node. If two or more nodes are connected on a single output line, the audio data coming from the input lines is either mixed or switched at the node. The audio data is mixed if the node values are identical and is switched if the node values are different. When the node values are different, the input data at the highest value node is always switched to the audio output line whenever it contains valid (that is, non silent) audio data and regardless of the energy level of the other connected input lines. The AUDIOTOPOLOGYCONTROL_CROSSBAR_S structure allows the multipoint processing filter 144 to set and retrieve values for the audio crossbar. This structure preferably comprises the property pAudioInputStreams (specifies the list of audio input streams to be routed to the audio output streams pointed to by pAudioOutputStreams[ ]. Each stream is identified using its positional index in the crossbar), dwNumAudioInputStreams (specifies the number of valid entries in pAudioInputStreams[ ]), pAudioOutputStreams (specifies the list of audio output streams to be connected to the audio input streams pointed to by pAudioInputStreams[ ]. Each stream is identified using its positional index in the crossbar), dwNumAudioOutputStreams (specifies the number of valid entries in pAudioOutputStreams[ ]), and panTopology (specifies an array of AUDIO_NODE_S structures describing the audio crossbar topology).

In FIG. 6, nodes 182-188 have zero values, indicating that audio output stream 0 is disconnected. Nodes 190, 198, 206 have non-zero values, indicating that audio input stream 0 is being routed to all other participants. Situations where this may occur is if participant 0 is a broadcaster giving a conference, or an audio feed coming from a file or a news radio that is being listened to by all participants. Nodes 188, 196, 204, and 212 have a zero value. This indicates that participant 3 is in the conference as a passive listener. Nodes 206, 208, 210 have equal values which indicates that participant 3 can hear the audio of all other participants, which is mixed whenever two or more participants are talking at the same time. Nodes 192 and 196 have zero values and nodes 190 and 194 have non-zero values with node 194 having a higher value than node 190. This indicates that participant 1 is listening to participant 0 and participant 2 and whenever participant 2 is talking, the audio stream coming from participant 0 is preempted. Nodes 202 and 204 have zero values and nodes 198 and 200 have non-zero values with node 200 having a higher value than node 198. This indicates that participant 2 is listening to participant 0 and participant 1 and whenever participant 1 is talking, the audio stream coming from participant 0 will be preempted. This may occur when participants 1 or 2 care more about exchanging comments on the audio feed coming from participant 0 than the actual content of participant 0's audio stream.

Similar to audio streams, routing of video input streams towards video output streams is described using a crossbar. Each node is described using a VIDEO_NODE_S bitfield. and each crossbar node has a priority value, a picture composition flag to specify the video picture composition used, and a quadrant to specify the video picture quadrant in the video output stream to be used for the video input stream. The multipoint processing filter 144 uses the priority value, picture composition flag, and quadrant to understand the desired overall topology.

A priority value of zero signals an unconnected node. Every other priority value indicates a connected node. If two or more nodes are connected on a single output line, the video data coming from the input lines is switched at the node. The video data is mixed if the priority values are identical and is switched if the priority values are different. When the priority values are different, the input data at the highest value node is always switched to the video output line. The VIDEOTOPOLOGYCONTROL_CROSSBAR_S structure allows the multipoint processing filter 144 to set and retrieve values for the audio crossbar. This structure preferably comprises pVideoInputStreams (specifies the list of video input streams to be routed to the video output streams pointed to by pVideooutputStreams[ ] and each stream is identified using its positional index in the crossbar), dwNumVideoInputStreams (specifies the number of valid entries in pVideoInputStreams[ ] and pAssociatedAudioInputStreams[ ]), pAssociatedAudioInputStreams (specifies the list of audio input streams associated to the video input streams listed in pVideoInputStreams[ ]) pVideoOutputStreams (specifies the list of video output streams to be connected to the video input streams pointed to by pVideoInputStreams[ ] and each stream is identified using its positional index in the crossbar), dwNumVideoOutputStreams (specifies the number of valid entries in pVideooutputStreams[ ]), and panTopology (specifies an array of VIDEO_NODE_S structures describing the video crossbar topology).

The picture composition flag is used to select the type of view and sub-picture location of the video stream being rendered at a conference participant's location. The types of views are set by flags. The views set by picture composition flags are illustrated in FIGS. 8a-i. The picture composition flags preferably include PictureCompositionFlag_None 268, which specifies basic switched video mode without any video mixing, PictureCompositionFlag_DualView_VSplit_NoCrop 270, PictureCompositionFlag_DualView_VSplit_Cropped 272, PictureCompositionFlag_DualView_HSplit_NoCrop 274, PictureCompositionFlag_DualView_HSplit_Cropped 276, PictureCompositionFlag_Quadrature 278, PictureCompositionFlag_9SubPictures 280, PictureCompositionFlag_16SubPictures 282, and PictureCompositionFlag_MixedView 284. The numbers in the sub-pictures of FIGS. 8a-i are the quadrant numbers. A PictureCompositionFlag_Custom flag, which is also a picture composition flag, allows vendors to customize picture composition modes that can be enabled from applications.

Figure 7:
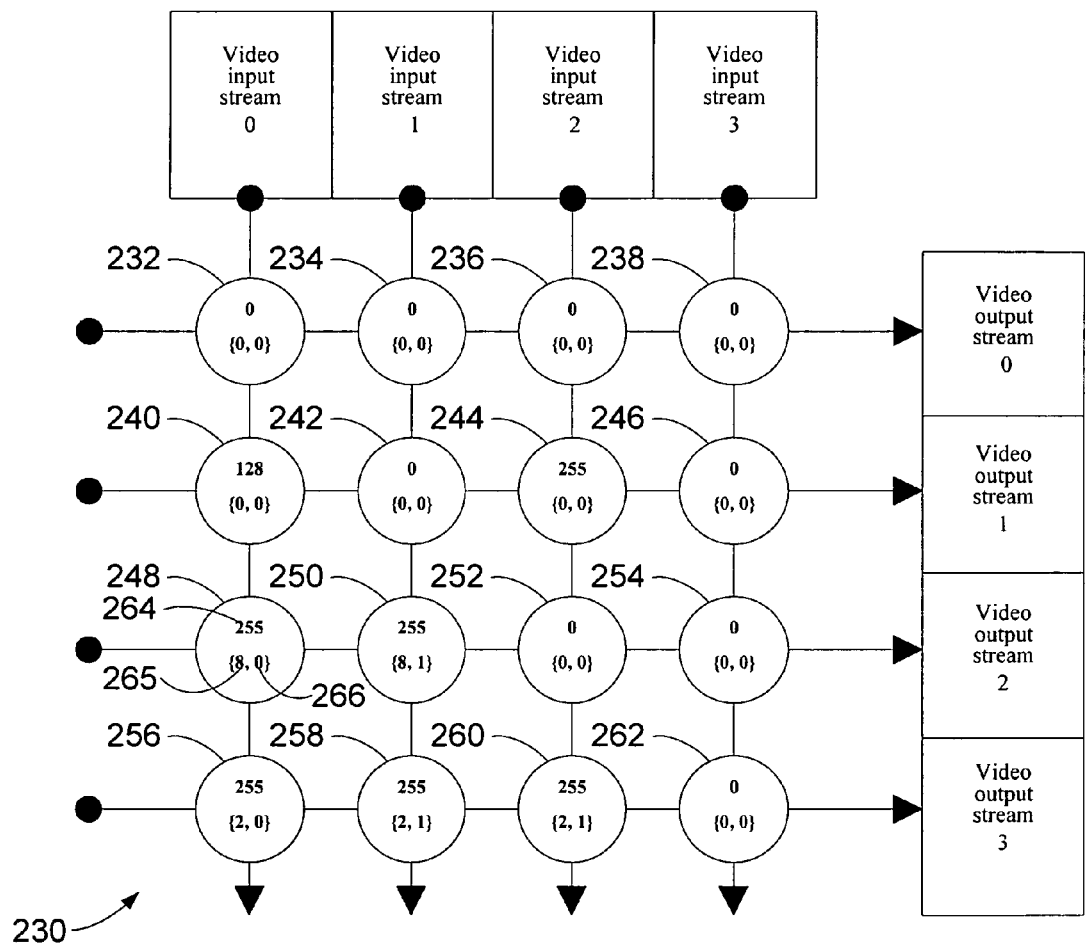
FIG. 7 is an illustration of a video crossbar illustrating how video input streams are routed to video output streams.
Figure 8A:
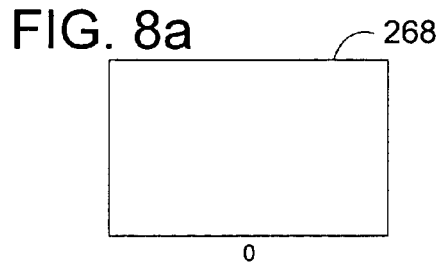
FIGS. 8a-i illustrate the default video frames that an application can command the multipoint processing terminal to use.
Figure 8B:
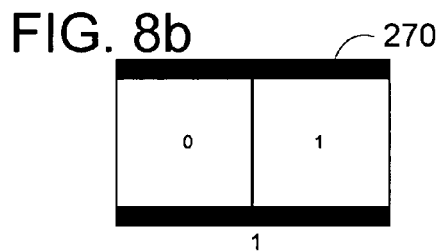
Figure 8C:
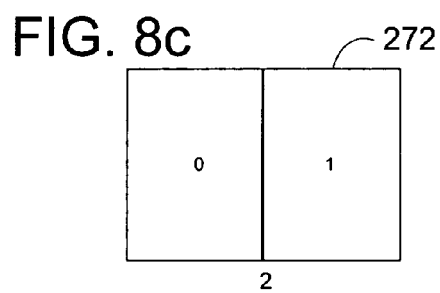
Figure 8D:
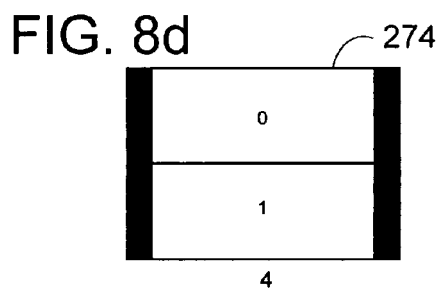
Figure 8E:
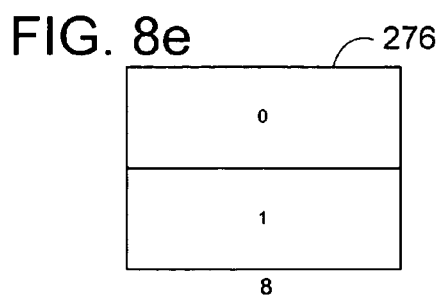
Figure 8F:
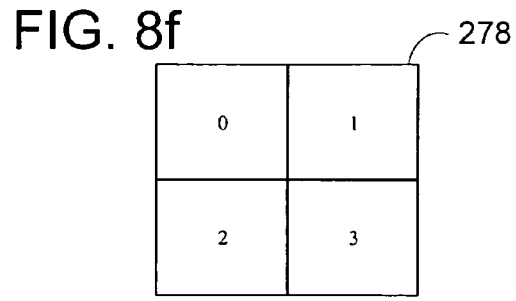
Figure 8G:
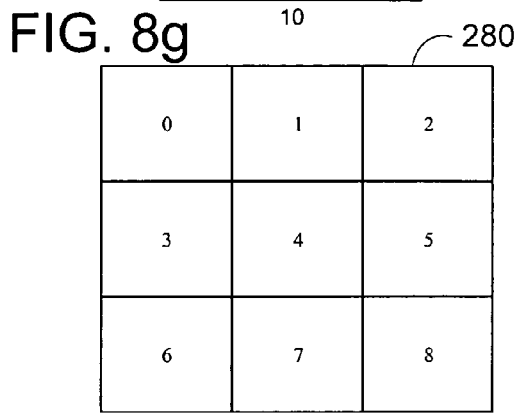
Figure 8H:
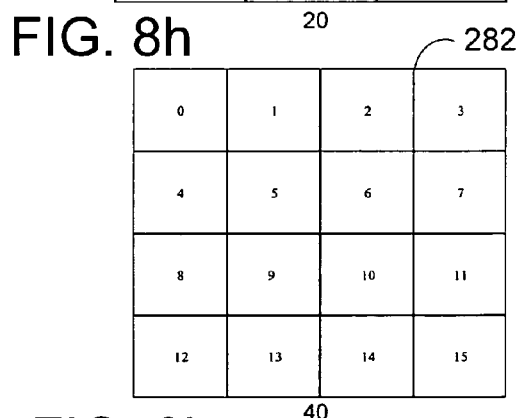
Figure 8I:
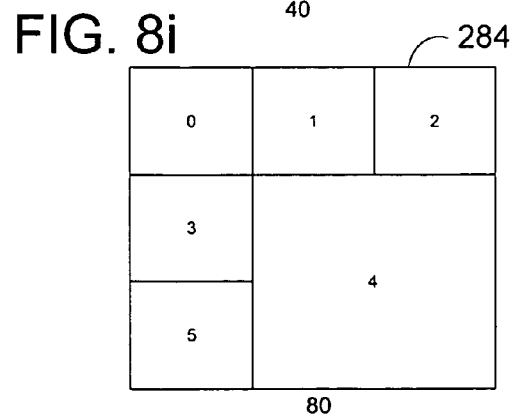

In FIG. 7, each node is represented by a priority value 264, a picture composition value 265, and a quadrant value 266. The picture composition value 265 corresponds to a picture composition flag and the quadrant value 266 corresponds to the quadrant that the input stream is to be displayed on the output stream.

Nodes 232-238 have zero priority values, indicating that video output stream 0 is disconnected. Nodes 240, 248, 256 have non-zero priority values, indicating that video input stream 0 is being routed to all other participants. Situations where this may occur is if participant 0 is a broadcaster giving a conference, or a video feed coming from a file or a news video that is being watched by all participants.

Nodes 238, 246, 254, and 262 have a zero priority value. This indicates that participant 3 is in the conference as a passive viewer. Nodes 256, 258, 260 have equal priority values and the picture composition value of 2 indicates that the view will be the PictureCompositionFlag_DualView_VSplit_Cropped 272 view. Node 256 has a quadrant value of 0 and nodes 258 and 260 have a quadrant value of 1. These values indicate that participant 3 can view the video of all other participants, with the video from participant 0 displayed in the left part of the video frame, and the video from participant 1 or 2 displayed in the right part of the video frame. The video from participant 1 or 2 will be displayed based on the audio activity (i.e., who is talking) of participant 1 and 2.

Nodes 242 and 246 have zero priority values and nodes 240 and 244 have non-zero priority values with node 244 having a higher priority value than node 240. The picture composition value is 0 and quadrant value is 0, indicating the PictureCompositionFlag_None 268 view will be used. This indicates that participant 1 is viewing participant 0 or participant 2 in a full video frame and the video will be switched between participant 0 and participant 2. Whenever participant 2 is talking, the video stream coming from participant 0 will be preempted.

Nodes 252 and 254 have zero priority values and nodes 248 and 260 have non-zero priority values with node 260 having a higher priority value than node 248. The picture composition value is 8 indicating that the PictureCompositionFlag_DualView_HSplit_Cropped 276 view will be seen by participant 2. The video input stream from participant 0 is located in quadrant 0 and the video input stream from participant 0 is located in quadrant 1. This means that participant 2 is watching participant 0's video and participant 1's video with participant 0's video always displayed in the top part of the image and participant 1's video always displayed in the lower part of the video frame.

Returning to FIG. 5, each input and output pin of the multipoint processing filter 144 is in part an aggregation of traditional DirectShow interfaces exposed by KSProxy. Additional interfaces which are unique to a multipoint processing acceleration architecture according to the invention may be implemented by the multipoint processing filter 144 using the IksControl interface. Such interfaces include the IH245DecoderCommand, IcrossbarPinInfo, IH245EncoderCommand, INetworkStats, IbitRateConrol, IframeRateControl, and IRTPControl.

In order to issue H.245 commands and indications on behalf of the multipoint processing filter 144, the MSP Channel Controller 177 exposes the IVidEncChannelControl and IChannelControl outgoing interfaces to the RTP-packetized compressed video input pins 162, 170 of the multipoint processing filter 144. This pin may call upon the IVidEncChannelControl interface to send H.245 commands such as requests for I-frame, group of blocks, macro-block updates or send a temporal/spatial trade-off command to the remote sending endpoint. It may use the IChannelControl interface to send a flow control command to the remote endpoint. There is no direct way for a multipoint processing minidriver 150 to make calls on a user-mode outgoing interface. To make calls, multipoint processing minidriver implementers use the events defined in two event sets called KSEVENTSETID_H245VIDENCCOMMAND and KSEVENTSETID_H245GENERALCOMMAND to signal the multipoint processing filter RTP-packetized compressed video input pin 162, 170 that it needs to make a call to the IVidEncChannelControl or IChannelControl interfaces on a stream basis.

The MSP Channel Controller 177 uses the IH245DecoderCommand interface to communicate H.245 decoder commands and video temporal/spatial trade-off change indications to the RTP-packetized compressed video input pin of the multipoint processing filter 144. The MSP 140 uses the ICrossbarPinInfo to retrieve the direction and crossbar positional index of a pin. The IH245DecoderCommand and ICrossbarPinInfo interfaces are not standard DirectShow interfaces and are not supported natively by KSProxy. The multipoint processing filter 144 implements those interfaces by calling the IKsControl interface methods exposed by KSProxy on the multipoint processing accelerator video input streams. Multipoint processing minidriver implementers preferably shall add support for the PROPSETID_H245VIDDECCOMMAND and PROPSETID_TOPOLOGYINFO property sets, in order to implement these interfaces.

The IH245DecoderCommand interface contains a set of methods preferably including videoFreezePicture and videoTemporalSpatialTradeOff. The videoFreezePicture method, or command, is used to specify to the RTP-packetized compressed video input pin 162, 170 to complete updating the current video frame and subsequently display the frozen picture until receipt of the appropriate freeze-picture release control signal. The videoTemporalSpatialTradeOff command is used to indicate to the RTP-packetized compressed video input pin 162, 170 the current video temporal/spatial trade-off of the remote encoder. As previously indicated, the IH245DecoderCommand is not a standard DirectShow interface. The multipoint processing filter 144 uses the generic IKsControl interface and defines the property set PROPSETID_H245VIDDECCOMMAND. The PROPSETID_H245VIDDECCOMMAND contains the properties PROPSETID_H245VIDDECCOMMAND_FREEZEPICTURE (used to specify to the RTP-packetized compressed video input stream to complete updating the current video frame and subsequently display the frozen picture until receipt of the appropriate freeze-picture release control signal) and KSPROPERTY_H245VIDDECINDICATION_TSTRADEOFF (used to indicate to the RTP-packetized compressed video input pin the current video temporal/spatial trade-off of the remote encoder).

The IVidEncChannelControl interface is an existing interface that contains the methods videoFastUpdatePicture (used to command the remote encoder to enter the fast-update mode at its earliest opportunity), videoFastUpdateGOB (used to command the remote encoder to perform a fast update of one or more GOBs), videoFastUpdateMB (used to command the remote encoder to perform a fast update of one or more MBs), videoSendSyncEveryGOB (used to command the remote encoder to use sync for every GOB as defined in H.263 or to decide the frequency of GOB syncs), videoNotDecodedMBs (used to indicate to the remote encoder that a set of MBs has been received with errors and that any MB in the specified set has been treated as not coded), and videoTemporalSpatialTradeOff (used to command a remote encoder to set its relative tradeoff between high spatial resolution and a high frame rate). Multipoint processing minidrivers have no direct way to make function calls on a user-mode outgoing interface. A multipoint processing minidriver 150 uses a new event set called KSEVENTSETID_H245VIDENCCOMMAND to signal the multipoint processing filter's RTP-packetized compressed video input pin 162, 170 that it needs to make a call to the IVidEncChannelControl interface, on a stream basis. The KSEVENTSETID_H245VIDENCCOMMAND event set contains the event KSEVENT_H245VIDENCCOMMAND_SEND (used to signal the multipoint processing filter's RTP-packetized compressed video input pin that it needs to send an H.245 Command to the remote video encoder).

The IChannelControl interface contains the SetMaxBitrate method, which is used to signal flow limits to the remote endpoint. Multipoint processing minidrivers have no direct way to make function calls on a user-mode outgoing interface. A multipoint processing minidriver 150 uses a new event set called KSEVENTSETID_H245GENERALCOMMAND to signal the multipoint processing filter's RTP-packetized compressed video input pin 162, 170 that it needs to make a call to the IChannelControl interface, on a stream basis. The KSEVENTSETID_H245GENERALCOMMAND event set contains the KSEVENT_H245GENERALCOMMAND_SEND event, which is used to signal the multipoint processing filter's RTP-packetized compressed video input pin 162, 170 that it needs to send an H.245 Command to the remote encoder.

As previously explained, a multipoint processing filter 144 exposes an IAudioTopologyControl and an IVideoTopologyControl interface, which are used to control the routing of input streams towards output streams using a crossbar. In order to uniquely identify the position of the input and output streams as they are setup in a crossbar, the multipoint processing filter 144 needs to be able to query each stream for its direction (input and output stream) and a positional index in the crossbar. If there are M input streams and N output streams, the positional index for an input stream is a value between 0 and M−1, and, between 0 an N−1 for an output stream. In order to provide this information, the RTP-packetized compressed video input pin 162, 170 provides the multipoint processing filter 144 with a pointer to an ICrossbarPinInfo interface containing the method GetPinInfo that is used to retrieve the direction and crossbar positional index of a pin. The ICrossbarPinInfo interface is not a standard DirectShow interface, so it is not implemented natively by KSProxy. The multipoint processing filter 144 uses the generic IKsControl interface and defines the property set called PROPSETID_TOPOLOGYINFO. A multipoint processing minidriver 150 uses the properties defined in this new set on a stream basis. The PROPSETID_TOPOLOGYINFO property set contains the property KSPROPERTY_TOPOLOGYINFO_ID, which is used to retrieve the direction and crossbar positional index of a stream.

The multipoint processing filter 144 exposes a few interfaces supported by the RTP-packetized compressed video output pin 164, 172 to the MSP Channel Controller 177, the network sink filter 146, and the Quality Controller (not shown). The MSP Channel Controller 177 uses the IH245EncoderCommand interface to communicate H.245 commands to the RTP-packetized compressed video output pin 164, 172. The network sink filter 146 uses the INetworkStats interface to inform the RTP-packetized compressed video output pin 164, 172 of the transmission channel characteristics, and the IRTPControl interface to dynamically modify or query for the maximum RTP packet size the multipoint processing filter's RTP-packetized compressed video output pin 164, 172 can generate. The Quality Controller uses the IBitrateControl and IFrameRateControl interfaces to initialize and regulate the outgoing bitrate and frame rate of the RTP-packetized compressed video output pin 164, 172.

The IH245EncoderCommand, INetworkStats, IRTPControl, IBitrateControl, and IFrameRateControl interfaces are not directly available on KSProxy. The multipoint processing filter 144 implements these interfaces by calling the IKsControl methods exposed by KSProxy on the multipoint processing accelerator video output stream.

The MSP Channel Controller 177 exposes the IVidDecChannelControl outgoing interface to the RTP-packetized compressed video output pin 164, 168 of the multipoint processing filter 144 in order to issue H.245 commands on behalf of the multipoint processing filter 144. The IVidDecChannelControl interface can be used to send videoFreezePicture H.245 commands. There is no direct way for a multipoint processing minidriver 150 to make calls on a user-mode outgoing interface. A new event set called KSEVENTSETID_H245VIDDECCOMMAND is defined to allow minidriver implementers to signal the multipoint processing filter's RTP-packetized compressed video output pin 164, 172 that it needs to make a call to the IVidDec-ChannelControl interface on a stream basis.

The IH245EncoderCommand interface contains a set of methods preferably including videoFastUpdatePicture, videoFastUpdateGOB, videoFastUpdateMB, VideoSendSyncEveryGOB, VideoSendSyncEveryGOBCancel, and videoNotDecodedMBs. The multipoint processing filter 144 provides the IH245EncoderCommand on each RTP-packetized compressed video output pin. The videoFastUpdatePicture method is used to specify to the RTP-packetized compressed video output pin 164, 172 to enter the fast-update picture mode at its earliest opportunity. This method is used with all video compression algorithms as a generic way to generate a keyframe (I-frame). The videoFastUpdateGOB method is used to specify to the RTP-packetized compressed video output pin to perform a fast update of one or more GOBs (Group-Of-Blocks). In H.263, a GOB consists of a row of k*16 lines with k=1 for sub-QCIF, QCIF and CIF, k=2 for 4CIF and k=4 for 16CIF; thus there are 6GOBs for sub-QCIF, 9 for QCIF, and 18 for CIF, 4CIF, and 16CIF. Data for each GOB consists of a GOB header (which may be empty) followed by data for each of the macroblocks (MBs) contained in a GOB. The videoFastUpdateMB method is used to specify to a RTP-packetized compressed video output pin 164, 172 to perform a fast update of one or more MBs (Macroblock). The VideoSendSyncEveryGOB is used to specify to the RTP-packetized compressed video output pin 164, 172 to use sync for every GOB. The VideoSendSyncEveryGOBCancel method is used to allow the RTP-packetized compressed video output pin 164, 172 to decide the frequency of GOB syncs. The videoNotDecodedMBs is used to indicate to the RTP-packetized compressed video output pin 164, 172 that a set of MBs has been received with errors and that any MB in the specified set has been treated as not coded. The IH245EncoderComrnmand interface is not a standard DirectShow interface. The multipoint processing filter 144 uses the generic IksControl interface and defines the property set PROPSETID_H245VIDENCCOMMAND that minidriver implementers handle on a stream basis. The PROPSETID_H245VIDENCCOMMAND property set contains the properties KSPROPERTY_H245VIDENCCOMMAND_VIDEOFASTUPDATEPICTURE (used to command the compressed video output stream to enter the fast-update picture mode at its earliest opportunity), KSPROPERTY_H245VIDENCCOAND_VIDEOFASTUPDATEGOB (used to command the compressed video output stream to perform a fast update of one or more GOBs), KSPROPERTY_H245VIDENCCOMMAND_VIDEOFASTUPDATEMB (used to command the compressed video output stream to perform a fast update of one or more MBs), KSPROPERTY_H245VIDENCCOAND_SEND SYNCEVERYGOB (used to command the compressed video output stream to perform a fast update of one or more GOBs), and KSPROPERTY_H245VIDENCINDICATION_ VIDEONOTDECODEDMB (used to command the compressed video output stream to perform a fast update of one or more GOBs).

The IvidDecChannelControl interfaces contains the videoFreezePicture method that is used to specify to the remote decoder to complete updating the current video frame and subsequently display the frozen picture until receipt of the appropriate freeze-picture release control signal. There is no direct way for a multipoint processing minidriver 150 to make function calls on a user-mode outgoing interface. Multipoint processing minidriver implementers preferably shall use the event defined in a new event set called KSEVENTSETID_H245VIDDECCCOMMAND to signal the multipoint processing filter's RTP-packetized compressed video output pin 164, 172 that it needs to make a call to the IVidDecChannelControl interface on a stream basis. The KSEVENTSETID_H245VIDDECCOMMAND event set contains the event KSEVENT_H245VIDDECCOMMAND_SEND that is used to signal the multipoint processing filter's RTP-packetized compressed video output pin that it needs to send an H.245 Command to the remote video decoder.

The INetworkStats interface is used to communicate the network channel characteristics (losses) to the compressed video output pin 164, 172. The methods of the this interface are called by the multipoint processing filter 144 periodically based on monitored network performances. The RTP-packetized compressed video output pin 164, 172 is responsible for taking appropriate actions if needed. The INetworkStats interface contains a set of methods preferably including SetChannelErrors, GetChannelErrors, GetChannelErrorsRange, SetPacketLossRate, and GetPacketLossRate. The SetChannelErrors method is used to inform the RTP-packetized compressed video output pin 164, 172 of the error channel conditions. The GetChannelErrors method is used to supply the error channel conditions the RTP-packetized compressed video output pin 164, 172 is currently setup for to the network sink filter 144. The GetChannelErrorsRange method is used to retrieve minimum, maximum, support, and default values for the channel error conditions with which the RTP-packetized compressed video output pin 164, 172 may be setup. The SetPacketLossRate method is used to inform the RTP-packetized compressed video output pin of the channel packet loss rate. The GetPacketLossRate method is used to supply to the network sink filter 146 the packet loss rate channel conditions with which the RTP-packetized compressed video output pin is currently setup. The INetworkStats interface is not a standard DirectShow interface. The multipoint processing filter 144 uses the generic IKsControl interface and defines a new property set called PROPSETID_NETWORKSTATS that multipont processing minidriver implementers preferably shall handle on a stream basis. The PROPSETID_NETWORKSTATS property set contains the properties KSPROPERTY_NETWORKSTATS_CHANNELERRORS (used to inform the RTP-packetized compressed video output pin 164, 172 of the error channel conditions, or supply to the network sink filter 146 the error channel conditions in which the RTP-packetized compressed video output pin is currently setup), and KSPROPERTY_NETWORKSTATS_PACKETLOSSRATE (used to inform the RTP-packetized compressed video output pin 164, 172 of the channel packet loss rate, or supply to the network sink filter 146 the packet loss rate with which the RTP-packetized compressed video output pin is currently setup), The IBitrateControl interface specifies a maximum bitrate to the RTP-packetized compressed video output pin of the multipoint processing accelerator. The methods on this interface are called at the beginning of a call by the Quality Controller to initialize the target bitrate, and then periodically during the entire call. The dynamic values for the target bitrates are based on network statistics provided by the network sink filter 146 to the Quality Controller. The initial and limit values for the target bitrate are based on application-defined settings provided by the application to the Quality Controller and the result of capability negotiations between the two connected endpoints provided by the MSP Channel Controller 177. The IBitrateControl interface contains a set of methods preferably including SetMaxBitrate, GetMaxBitrate, and GetMaxBitrateRange. The SetMaxBitrate method is used to specify to the RTP-packetized compressed video output pin the upper limit in bandwidth transmission. Note that the SetMaxBitrate method is also called by the MSP Channel Controller 177 whenever it receives a FlowControl command. The flow control command is used to allow the bit rate of the video stream to be controlled by the remote endpoint. The GetMaxBitrate method is used to retrieve the upper limit in bandwidth transmission with which the RTP-packetized compressed video output pin is currently setup. The GetMaxBitrateRange method is used to retrieve support, minimum, maximum, and default values for the upper limit in bandwidth transmission with which the RTP-packetized compressed video output pin may be setup. The IBitrateControl interface is not a standard DirectShow interface. The multipoint processing filter 144 uses the generic IKsControl interface and defines a new property set called PROPSETID_BITRATECONTROL that multipoint processing minidriver implementers handle on a stream basis. The PROPSETID_BITRATECONTROL property set contains the property KSPROPERTY_BITRATECONTROL_MAXBITRATE that is used to specify to the RTP-packetized compressed video output pin the upper limit in bandwidth transmission, or supply to the Quality Controller the upper limit in bandwidth transmission with which the RTP-packetized compressed video output pin is currently setup.

The IFrameRateControl interface specifies a target frame rate to the preview or RTP-packetized compressed video output pins of the multipoint processing accelerator. The methods on this interface are called at the beginning of a call by the Quality Controller to initialize the target frame rates, and then periodically during the entire call. The dynamic values for the target frame rates are based on the Quality Controller CPU usage measurements using CPU performance counters, as well as the past performance of the multipoint processing accelerator output bitrate controller. The initial and limit values for the target frame rate are based on user-defined settings provided by the application to the Quality Controller and the result of capability negotiations between the two connected endpoints provided by the MSP Channel Controller 177. The IFrameRateControl interface contains set of methods preferably including SetMaxFrameRate, GetMaxFrameRate, and GetMaxFrameRateRange. The SetMaxFrameRate method is used to specify to the preview or RTP-packetized compressed video output pin the video frame's average display time. The GetMaxFrameRate method is used to retrieve the video frame's average display time with which the preview or RTP-packetized compressed video output pin are currently setup. The GetMaxFrameRateRange method is used to retrieve support, minimum, maximum, and default values for the video frame's average display time with which the preview or RTP-packetized compressed video output pin may be setup. The IFrameRateControl interface is not a standard DirectShow interface. The multipoint processing filter 144 uses the generic IKsControl interface and defines a new property set called PROPSETID_FRAMERATECONTROL that multipoint processing minidriver implementers handle on a stream basis. The PROPSETID_FRAMERATECONTROL property set contains the property KSPROPERTY_FRAMERATECONTROL_MAXFRAMERATE that is used to specify to the preview or RTP-packetized compressed video output pin the video frame's average display time, or supply to the Quality Controller the video frame's average display time with which the preview or RTP-packetized compressed video output pin are currently setup.

The IRTPControl interface is used to dynamically adjust the maximum RTP packet size. The IRTPControl interface contains a set of methods preferably including SetMaxRTPPacketSize, GetMaxRTPPacketSize, GetMaxRTPPacketSizeRange. The SetMaxRTPPacketSize method is used to dynamically adjust the maximum RTP packet size (in bytes) to be generated by the multipoint processing filter's RTP-packetized compressed video output pin 164, 172. Typically, this number is just below the MTU (Maximum Transmission Unit) size of the network. The GetMaxRTPPacketSize method is used to supply to the network sink filter 146 the current maximum RTP packet size (in bytes) generated by the multipoint processing filter's RTP-packetized compressed video output pin 164, 172. The GetMaxRTPPacketSizeRange method is used to query support, minimum, maximum, and default values for the maximum RTP packet size (in bytes) generated by the multipoint processing filter's RTP-packetized compressed video output pin 164, 172. The IRTPControl interface is not a standard DirectShow interface. The multipoint processing filter 144 uses the generic IKsControl interface and defines a new property set called PROPSETID_RTPCONTROL that multipoint processing minidriver implementers handle on a stream basis. The PROPSETID_RTPCONTROL property set contains the property KSPROPERTY_RTPCONTROL_MAXRTPPACKETSIZE that is used to retrieve/set the maximum RTP packet size.

Figure 9:
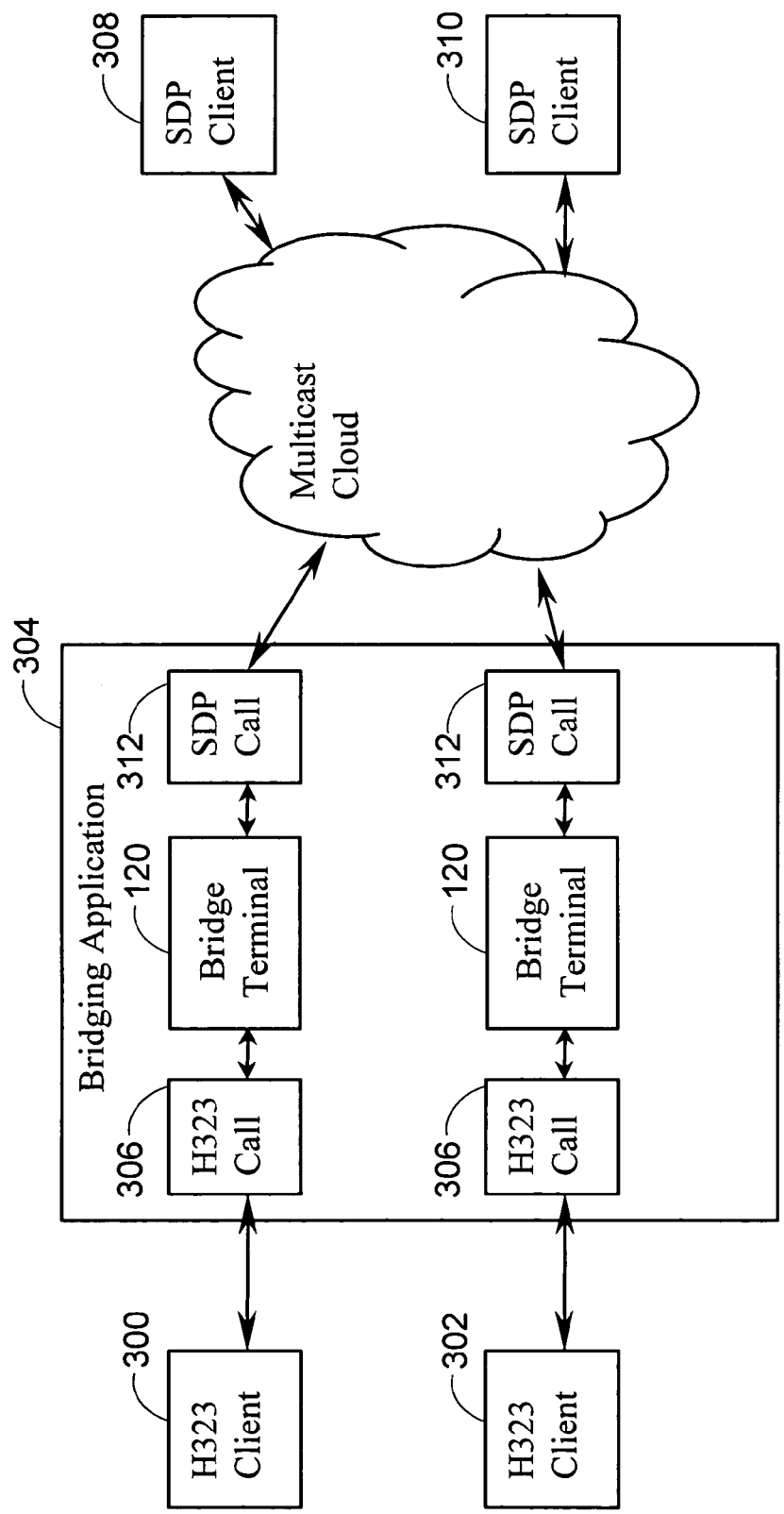
FIG. 9 is a block diagram of a bridging application employing a bridging terminal in a bridged conference.
Figure 10:
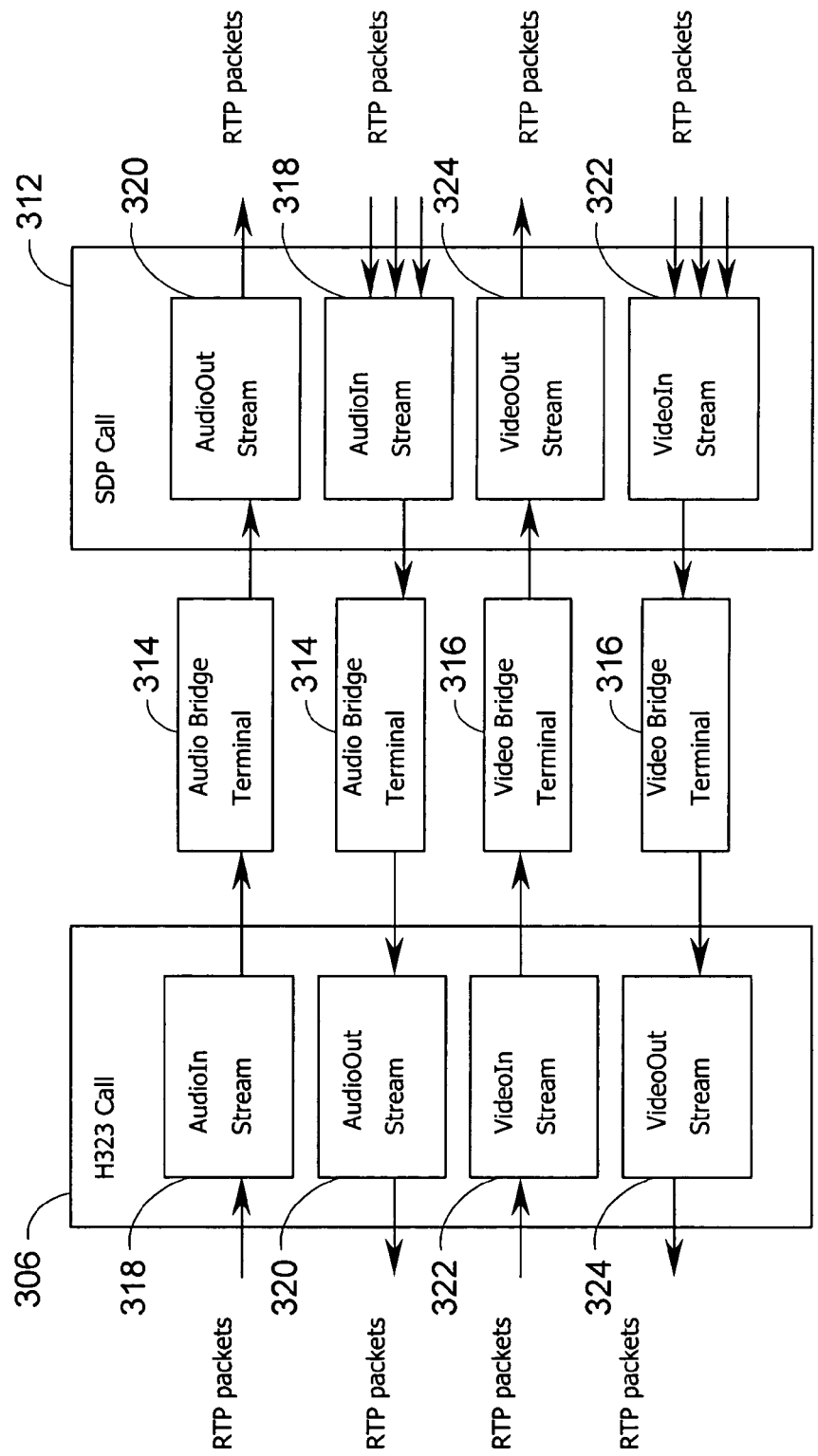
FIG. 10 is a block diagram illustrating a bridged call pair utilizing bridging terminals in a bridged conference.
Figure 11A:
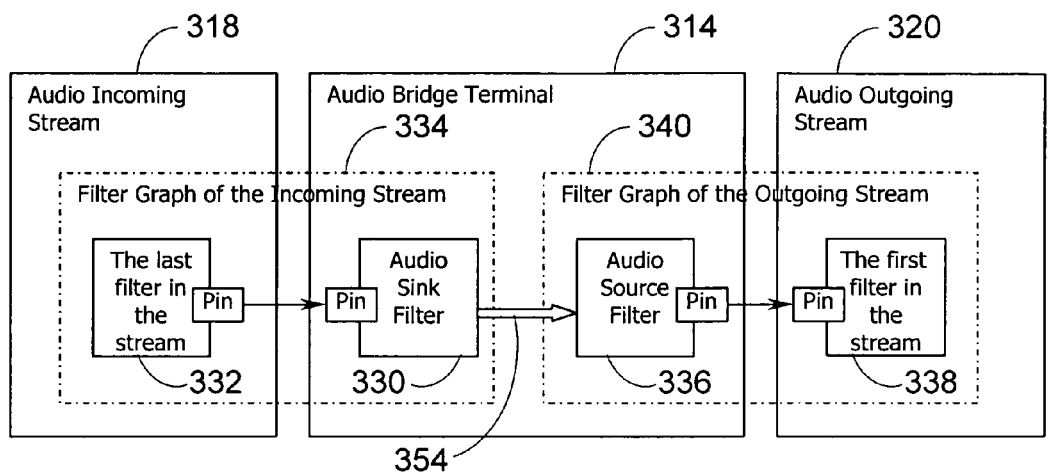
FIG. 11a is a block diagram illustrating an embodiment of an audio bridging terminal passing audio data from an audio incoming stream to an audio outgoing stream.
Figure 11B:
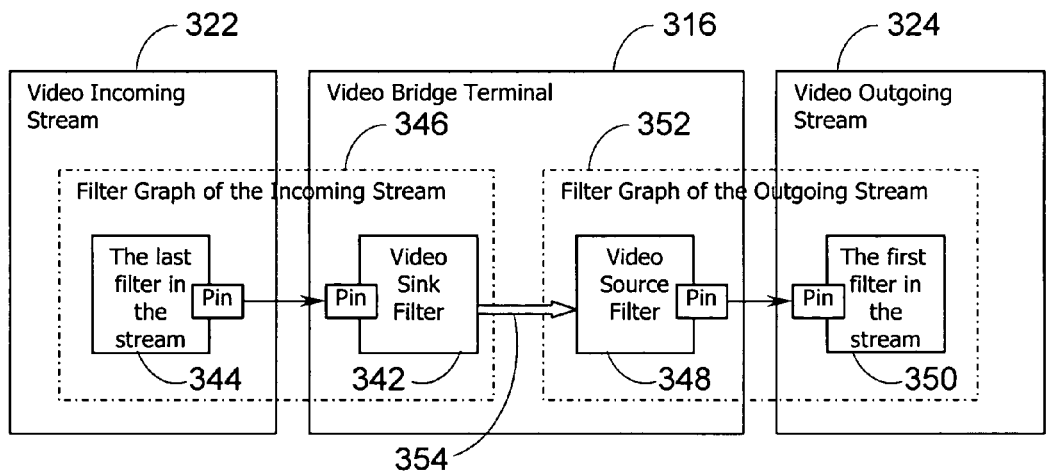
FIG. 11b is a block diagram illustrating an embodiment of a video bridging terminal passing video data from a video incoming stream to a video outgoing stream.

Turning now to FIGS. 9-11, the multicast bridging terminal 120 of FIG. 3 will now be described. As previously indicated, a multicast bridging terminal is used to allow a client using one type of control signaling and media streaming to participate in conferences using different types of control signaling and media streaming. The invention will be described using a SDP (Session Descriptor Protocol) based IP multicast conference and H.323 based clients. FIG. 9 shows H.323 clients in a bridged conference to a SDP based IP multicast conference. In FIG. 9, H.323 clients 300, 302 dial into a bridging application 304 via an H.323 call 306. The bridging application is provided the information needed for it to look for the SDP text that describes the conference in which SDP clients 308, 310 are participating. Once the bridging application receives the H.323 call from a H.323 client, it creates the SDP call 312, creates the multicast bridging terminals 120, and selects the terminals on the streams of the H.323 call 306 and SDP call 312 (see FIG. 10). The bridging application 304 then connects the SDP call 312 and answers the H.323 call 306.

A multicast bridging terminal can be an audio bridge terminal 314 or a video bridge terminal 316. The bridging application 304 connects an audio incoming stream 318 to an audio outgoing stream 320 via an audio bridge terminal 314. The bridging application 304 uses a video bridge terminal 316 to connect a video incoming stream 322 to a video outgoing stream 324.

FIG. 11 illustrates how the incoming streams are connected to the outgoing streams in one embodiment. In this embodiment, the incoming streams utilize the interconnected filter architecture of DirectShow. The audio bridge terminal 314 receives audio data from one incoming stream and forwards it to an outgoing stream. The audio bridge terminal 314 has an audio sink filter 330 connected to the last audio filter 332 of the filter graph 334 associated with the incoming audio stream and an audio source filter 336 connected to the first audio filter 338 of the filter graph 340 associated with the outgoing audio stream. The video bridge terminal 314 receives video data from one incoming stream and forwards it to an outgoing stream. Similar to the audio bridge terminal 314, the video bridge terminal 316 has a video sink filter 342 connected to the last video filter 344 of the filter graph 346 associated with the incoming video stream and a video source filter 348 connected to the first video filter 350 of the filter graph 352 associated with the outgoing video stream. It should be noted that the incoming stream's filter graph 346 and the outgoing stream's filter graph 352 could be combined into one filter. The audio source filter 336 and video source filter preferably have an interface 354 that the audio sink filter 330 and video sink filter 342 can call to provide data to the source filter. When the audio sink filter 330 or video sink filter 342 receives data from the last audio filter 332 or last video filter 344, the audio sink filter 330 or video sink filter 342 passes the sample to the audio source filter 336 or the video source filter 348.

In order to keep latency at a minimum, the audio data format for both the input stream and output stream is kept the same. The audio data format can be selected to any format. In one embodiment, this format is PCM linear, 16 bits per sample at 8 KHz. The audio source filter 336 should send data directly to the audio source filter 336 if audio frame sizes on the incoming stream and the outgoing stream are the same. If the audio frame sizes are different, the audio source filter 336 constructs audio frames of the proper size and copies the data into the audio frames. The audio sink filter 330 uses the allocator in the output pin of the last audio filter 332. The audio source filter 336 uses its own allocator on its output pin, and the allocator properties are set by the MSP 104. The output frame size is one of the allocator properties.

Timestamps, as known in the art, are used to ensure that audio and video samples are rendered in the proper sequence. The audio sink filter 330 should update its clock when a mix filter in the incoming stream's filter graph 334 sets a discontinuity flag on the first sample of a talk spurt and set the timestamps on audio samples according to the following rules:

1. If there is continuous data, the timestamp should increase based on the amount of data passed through. For example three 30 ms data frames should change the timestamp by 90 ms.
2. If there is a silence period, the timestamp should be adjusted to reflect the length of the silence period. It should be noted that the first data sample of a talk spurt delivered by a mixer filter only contains silence, which is the mixer filter's way of absorbing jitter. The audio sink filter 330 should discard this sample to avoid introducing latency, but should update the timestamp clock on this first data sample.

The video bridge terminal 316 performs video specific logic such as switching on I-frames. The I-frame information is in the RTP payload header in each packet. Similar to the audio bridge terminal 314, the data format for both the input stream and output stream is kept the same and can be any format. In one embodiment, the format of data is RTP H.263. The video sink filter 342 monitors the change of SSRC in the RTP packet. When a change occurs, the video sink filter 342 discards RTP packets until an I-frame is received or an application defined time period times out. If the predefined time period elapses and there is still no I frame, the video sink filter 342 can resume sending without waiting for an I-frame. The video sink filter 342 should only switch on a frame boundary, which is normally indicated by a timestamp change.

A bridging terminal 120 performs many functions that MSPs connect in filter graphs. These redundant functions may be removed from a filter graph when a bridging terminal 120 is selected. These functions include the encoder, send payload handler, decoder, and receive payload handler.

All of the references cited herein, including patents, patent applications, and publications, are hereby incorporated in their entireties by reference.

A multipoint processing architecture and a bridging architecture has been described with reference to specific embodiments. However, in view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Additionally, although the invention was described by reference to TAPI 3.0, DirectShow, and the Windows Driver Model, the invention is not limited to such an implementation. Therefore, the invention as described herein contemplates all such embodiments as may come within the scope of the following claims and equivalents thereof.

We claim:

1. A computer-readable medium having computer-executable instructions for communicating between an application and a multipoint processing module adapted to mix, switch, and process media streams, the multipoint processing module having at least one audio processor module for processing audio data in a multipoint conference and at least one video processor module for processing video data in a multipoint conference, the computer-executable instructions performing the step of:

exposing at least one application program interface by the multipoint processing module to receive a request from the application to command the multipoint processing module to modify a default operation of the multipoint processing module to alter at least one attribute of at least one of the audio processor module and video processor module, the application program interface for interfacing software components wherein said at least one application program interface comprises an audio interface, the application using said audio interface to request the multipoint processing module to change a routing of at least one audio input stream towards at least one audio output stream and wherein the request is selected from the group consisting of:
a command to retrieve an audio crossbar topology, the audio crossbar topology indicating how a set of audio input streams is being routed to a set of audio output streams;
a command to change the audio crossbar topology to indicate to the multipoint processing module how the set of audio input streams should be routed to a set of audio output streams;
a command to retrieve a value of an audio crossbar control parameter;
a command to set a value of an audio crossbar control parameter;

a command to retrieve a minimum value, a maximum value, and a default value for an audio crossbar control parameter;

a command to retrieve a mixing capability and a transcoding capability of the audio crossbar; and a command to retrieve an audio level of a list of audio input streams.

2. The computer-readable medium of claim 1 wherein the audio crossbar control parameter is selected from a group of audio crossbar control parameters, the group comprising:

a setting to specify a periodicity of an interrupt service routine;

a setting to specify a maximum number of mixed input signals;

a setting to enable and disable silence detection;

a setting to enable and disable silence compression; and a setting to enable and disable automatic gain control.

3. The computer-readable medium of claim 1 wherein the multipoint processing module disables the command to set a value of an audio crossbar control parameter when a control flag is set.

4. A computer-readable medium having computer-executable instructions for communicating between an application and a multipoint processing module adapted to mix, switch, and process media streams, the multipoint processing module having at least one audio processor module for processing audio data in a multipoint conference and at least one video processor module for processing video data in a multipoint conference, the computer-executable instructions performing the step of:

exposing at least one application program interface by the multipoint processing module to receive a request from the application to command the multipoint processing module to modify a default operation of the multipoint processing module to alter at least one attribute of at least one of the audio processor module and video processor module, the application program interface for interfacing software components wherein said at least one application program interface comprises a video interface, the application using said video interface to request the multipoint processing module to change a routing of at least one video input stream towards at least one video output stream and wherein the request is selected from the group consisting of:

a command to retrieve a video crossbar topology, the video crossbar topology indicating how a set of video input streams is being routed to a set of video output streams based on a content of associated audio input streams;

a command to change the video crossbar topology to indicate to the multipoint processing module how the set of video input streams should be routed to a set of video output streams based on a content of associated audio input streams;

a command to retrieve a value of a video crossbar control parameter;

a command to set a value of a video crossbar control parameter;

a command to retrieve a minimum value, a maximum value, and a default value for a video crossbar control parameter;

a command to retrieve a mixing capability and a transcoding capability of the video crossbar; and a command to retrieve a video level of a list of video input streams.

5. The computer-readable medium of claim 4 wherein the video crossbar control parameter is selected from a group of video crossbar control parameters, the group comprising:

a setting to specify a first time to evaluate whether a speaker is continuing to speak;

a setting to specify a second time during which a speaker and a video switching process can not be taken over by a second speaker; and a setting to specify a third time, the third time being the time when a switch is made and when a fast update request is sent to the speaker's system.

6. The computer-readable medium of claim 4 wherein the multipoint processing module disables the command to set a value of a video crossbar control parameter when a control flag is set.

7. A computer-readable medium having computer-executable instructions for communicating between an application and a multipoint processing module adapted to mix, switch, and process media streams, the multipoint processing module having at least one audio processor module for processing audio data in a multipoint conference, and at least one video processor module for processing video data in a multipoint conference, the computer-executable instructions performing the step of:

exposing at least one application program interface by the multipoint processing module to receive a request from the application to command the multipoint processing module to modify a default operation of the multipoint processing module to alter at least one attribute of at least one of the audio processor module and video processor module, the application program interface for interfacing software components wherein said at least one application program interface further comprises a video interface, the application using said video interface to request the multipoint processing module to change a routing of at least one video input stream towards at least one video output stream and wherein the request to route at least one audio input stream is selected from the group consisting of:

a command to retrieve an audio crossbar topology, the audio crossbar topology indicating how a set of audio input streams is being routed to a set of audio output streams;

a command to change the audio crossbar topology to indicate to the multipoint processing module how the set of audio input streams should be routed to a set of audio output streams;

a command to retrieve a value of an audio crossbar control parameter;

a command to set a value of an audio crossbar control parameter;

a command to retrieve a minimum value, a maximum value, and a default value for an audio crossbar control parameter;

a command to retrieve a mixing capability and a transcoding capability of the audio crossbar; and a command to retrieve an audio level of a list of audio input streams; and the request to route at least one video input stream is selected from the group consisting of:

a command to retrieve a video crossbar topology, the video crossbar topology indicating how a set of video input streams is being routed to a set of video output streams based on a content of associated audio input streams;

a command to change the video crossbar topology to indicate to the multipoint processing module how the set of video input streams should be routed to a set of video output streams based on a content of associated audio input streams;
a command to retrieve a value of a video crossbar control parameter;
a command to set a value of a video crossbar control parameter;
a command to retrieve a minimum value, a maximum value, and a default value for a video crossbar control parameter;
a command to retrieve a mixing capability and a transcoding capability of the video crossbar; and
a command to retrieve a video level of a list of video input streams.

8. The method of claim 7 wherein said at least one application program interface further comprises a format control interface, the application using said format control interface to retrieve and set an audio format and a video format, the format control interface comprising:
a command to retrieve a preferred audio and video format for a conference;
a command to set the preferred audio and video format for the conference;
a command to retrieve a format structure and configuration capability structure pair of a conference, the format structure and configuration capability structure pair describing an audio and video format supported by the conference;
a command to retrieve a number of audio and video format structure and configuration capability structure pairs that are available in a conference;
a command to reorder a list of preferred audio formats; and
a command to reorder a list of preferred video formats.

9. A multipoint processing accelerator apparatus for transmitting audio and video data over a plurality of channels in a multipoint conference being controlled by an application, the application controlling the apparatus by an application program interface of the apparatus, the apparatus comprising:
at least one hardware module having a default operation for applying signal processing operations to at least one of the audio and video data; and
a minidriver, said minidriver communicating with the application through at least one property set to do one of receiving a command to modify the default operation of the at least one hardware module and sending a command to the application
wherein the at least one property set comprises an audio topology property set and
wherein the audio topology property set comprises:
a property to do one of updating an audio crossbar content and retrieving an audio crossbar content;
a property to retrieve mixing and transcoding capabilities of an audio crossbar;
a property to do one of setting a periodicity of an interrupt service routine and getting a periodicity of an interrupt service routine;
a property to do one of setting a maximum number of mixed input signals and getting a maximum number of mixed input signals;
a property to do one of enabling silence detection and disabling silence detection;
a property to do one of enabling automatic gain control and disabling automatic gain control; and
a property to retrieve a value of an audio level of a list of audio input streams.

10. A multipoint processing accelerator apparatus for transmitting audio and video data over a plurality of channels in a multipoint conference being controlled by an application, the application controlling the apparatus by an application program interface of the apparatus, the apparatus comprising:
at least one hardware module having a default operation for applying signal processing operations to at least one of the audio and video data; and
a minidriver, said minidriver communicating with the application through at least one property set to do one of receiving a command to modify the default operation of the at least one hardware module and sending a command to the application
wherein the at least one property set comprises a video topology property set and
wherein the video topology property set comprises:
a property to do one of updating a video crossbar content and retrieving a video crossbar content;
a property to retrieve picture composition capabilities of the video crossbar;
a property to do one of setting a periodicity of an interrupt service routine and getting a periodicity of an interrupt service routine;
a property to do one of setting a time to evaluate whether a speaker is continuing to speak and getting a time to evaluate whether a speaker is continuing to speak;
a property to do one of setting a second time during which a speaker and a video switching process can not be taken over by a second speaker and getting a second time during which a speaker and a video switching process can not be taken over by a second speaker; and
a property to do one of setting a third time and getting a third time, the third time being the time when a switch is made and when a fast update request is sent to the speaker's system.

11. The apparatus according to claim 10 wherein the at least one property set comprises a decoder property set.

12. The apparatus according to claim 11 wherein the decoder property set comprises:
a property to specify that a video frame update be completed and a video frame be displayed until receiving a release signal; and
a property to indicate a video temporal and spatial trade-off of an encoder.

13. The apparatus according to claim 10 wherein the at least one property set comprises a video encoder send property set.

14. The apparatus according to claim 13 wherein the at least one hardware module comprises a video encoder, the video encoder send property set comprises:
a property to signal to the application that it needs to send a command to the video encoder.

15. The apparatus according to claim 10 wherein the at least one property set comprises a stream topology property set.

16. The apparatus according to claim 15 wherein the stream topology property set comprises:
a property to retrieve a direction and crossbar positional index of a stream.

17. The apparatus according to claim 10 wherein the at least one property set comprises a video encoder property set.

18. The apparatus according to claim 17 wherein the video encoder property set comprises:
a property to command a video output stream to enter a fast update picture mode;

a property to command the video output stream to perform a fast update of a group of blocks;

a property to command the video output stream to perform a fast update of a macroblock;

a property to command the video output stream to use sync for every group of blocks; and a property to provide an indication that a set of macroblocks has been received with errors and has been treated as not coded.

19. The apparatus according to claim 10 wherein the at least one property set comprises a network statistics property set.

20. The apparatus according to claim 19 wherein the network statistics property set comprises:

a property to do one of informing a video output pin of error channel conditions and supplying a media service provider component the error channel conditions; and a property to do one of informing the video output pin of a channel packet rate loss and supplying the media service provider component the channel packet rate loss.

21. The apparatus according to claim 10 wherein the at least one property set comprises a bandwidth property set.

22. The apparatus according to claim 21 wherein the bandwidth property set comprises:

a property to do one of specifying an upper limit in bandwidth transmission to a video output pin and supplying the upper limit bandwidth transmission of the video output pin to a media service provider component.

23. The apparatus according to claim 10 wherein the at least one property set comprises a frame rate property set.

24. The apparatus according to claim 23 wherein the frame rate property set comprises:

a property to do one of specifying a video frame's average display time to a video output pin and supplying the video frame average display time to a media service provider component.

25. The apparatus according to claim 10 wherein the at least one property set comprises a RTP control property set.

26. The apparatus according to claim 25 wherein the RTP control property set comprises:

a property to do one of retrieving a maximum RTP packet size and setting the maximum RTP packet size.

* * * * *